United States Patent
Serizawa et al.

(10) Patent No.: US 7,590,818 B2
(45) Date of Patent: Sep. 15, 2009

(54) STORAGE SYSTEM HAVING A PLURALITY OF VIRTUALIZATION APPARATUSES THAT ALLOCATE A STORAGE AREA, FORM A PLURALITY OF VIRTUAL VOLUMES, AND PROCESS INPUT-OUTPUT FROM A HOST PROCESSOR

(75) Inventors: Kazuyoshi Serizawa, Machida (JP); Norio Shimozono, Machida (JP); Yasutomo Yamamoto, Sagamihara (JP); Naoko Iwami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/014,456

(22) Filed: Jan. 15, 2008

(65) Prior Publication Data
US 2008/0140906 A1 Jun. 12, 2008

Related U.S. Application Data

(63) Continuation of application No. 11/590,425, filed on Oct. 30, 2006, now Pat. No. 7,334,106, which is a continuation of application No. 10/735,155, filed on Dec. 12, 2003, now Pat. No. 7,203,814.

(30) Foreign Application Priority Data
Oct. 6, 2003 (JP) ............................. 2003-346608

(51) Int. Cl.
G06F 12/00 (2006.01)
(52) U.S. Cl. .................... 711/202; 711/114; 711/170
(58) Field of Classification Search .................. None
See application file for complete search history.

(56) References Cited

U.S. PATENT DOCUMENTS

| | | | |
|---|---|---|---|
| 5,956,750 A | 9/1999 | Yamamoto et al. | |
| 6,161,191 A | 12/2000 | Slaughter et al. | |
| 6,378,039 B1 | 4/2002 | Obara et al. | |
| 6,446,161 B1 | 9/2002 | Yamamoto et al. | |
| 6,526,492 B1 | 2/2003 | McBreaty et al. | |
| 6,542,961 B1 | 4/2003 | Matsunami et al. | |
| 6,766,430 B2 | 7/2004 | Arakawa et al. | |
| 2002/0144076 A1* | 10/2002 | Yamamoto et al. | 711/202 |

FOREIGN PATENT DOCUMENTS

| | | |
|---|---|---|
| EP | 1178407 A2 | 2/2002 |
| JP | 01-108667 A | 4/1989 |

(Continued)

OTHER PUBLICATIONS

European Patent Office (EPO) Search Report dated for EPO patent application EP04023371 (Sep. 23, 2008).

(Continued)

*Primary Examiner*—Reginald G Bragdon
*Assistant Examiner*—Shawn X Gu
(74) *Attorney, Agent, or Firm*—Townsend and Townsend and Crew LLP

(57) ABSTRACT

In a storage system having a plurality of virtualization apparatuses that allocate a storage area which a storage device has, form a plurality of virtual volumes, and process input-output from a host processor to one of the virtual volumes, a request for completing all the input-output being processed that is received from the host processor and temporarily holding the input-output processing received subsequently is issued to the plurality of virtualization apparatuses, when a completion report of the processing of the input-output in response to the request is received from the plurality of virtualization apparatuses and the completion report is received from all the virtualization apparatuses to which the request was issued, an instruction of an allocation change of the storage area of the storage device is sent to all the virtualization apparatuses, and when the completion report of the allocation change is received from all the virtualization apparatuses, the storage area of the storage device is allocated to the virtual volume by sending an instruction for releasing a state of the input-output held temporarily to all the virtualization apparatuses.

10 Claims, 29 Drawing Sheets

FOREIGN PATENT DOCUMENTS

| | | |
|---|---|---|
| JP | 11-296313 A | 10/1999 |
| JP | 2000-242434 A | 9/2000 |
| JP | 2001-109704 A | 4/2001 |
| JP | 2001-228981 A | 8/2001 |
| JP | 2002-082775 A | 3/2002 |
| WO | WO03/071419 A2 | 8/2003 |

OTHER PUBLICATIONS

Japan Patent Office (JPO) office action for JPO laid-open patent application 2003-346608 (Dec. 9, 2008).

Japan Patent Office (JPO) office action for JPO laid-open patent application 2003-346608 (May 12, 2009).

* cited by examiner

FIG.26
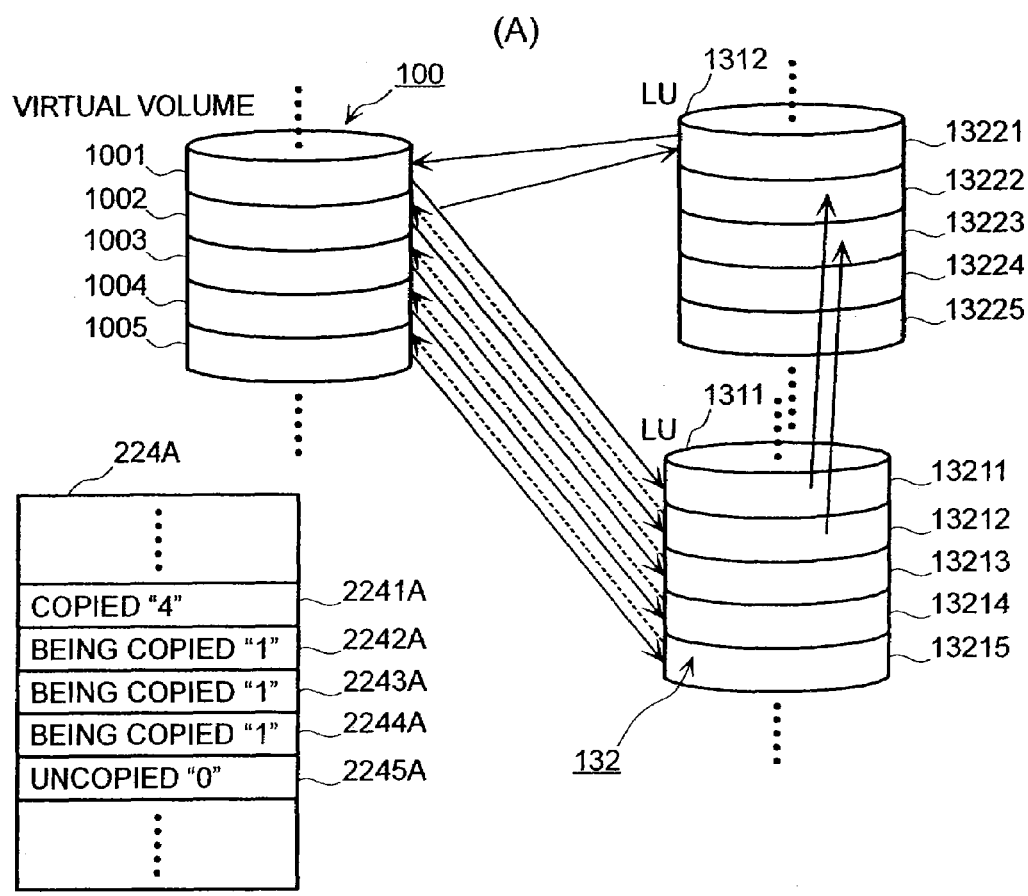
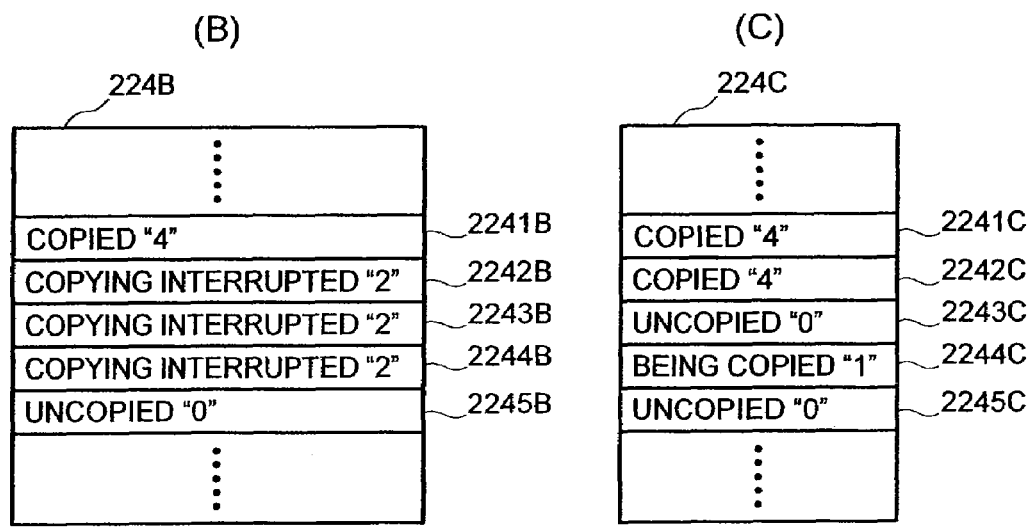

STORAGE SYSTEM HAVING A PLURALITY OF VIRTUALIZATION APPARATUSES THAT ALLOCATE A STORAGE AREA, FORM A PLURALITY OF VIRTUAL VOLUMES, AND PROCESS INPUT-OUTPUT FROM A HOST PROCESSOR

CROSS-REFERENCES TO RELATED APPLICATIONS

This is a continuation of U.S. patent application Ser. No. 11/590,425, filed Oct. 30, 2006, now U.S. Pat. No. 7,334,106, which is a continuation of U.S. patent application Ser. No. 10/735,155, filed Dec. 12, 2003, now U.S. Pat. No. 7,203,814, which claims priority from Japanese Patent Application No. 2003-346608, filed Oct. 6, 2003, the entire disclosure of which is incorporated herein by reference.

BACKGROUND OF THE INVENTION

1. Field of the Invention

The present invention relates to a storage system, and more particularly to a change in the allocation of a real storage area to a virtual volume in a storage system having a virtualization apparatus of a redundant configuration.

2. Description of the Prior Arts

In the so-called SAN (Storage Area Network), a system that sets a plurality of virtual volumes with reference to the storage area of a storage device and uses their volumes from a host processor via a network is known.

Regarding a storage virtualization apparatus that virtualizes the storage device connected through the network and enables input-output (I/O) from the host processor, for example, there is such a system as disclosed in Japanese Unexamined Patent Application Publication No. Hei 2000-242434 (Patent Reference 1). According to this art, a storage device to which a virtual storage area provided to a host is allocated is changed by installing switching equipment 20 between a storage device system 1 and a host 30 and the switching equipment 20 changes the virtualization setting of a virtual storage device system provided to the host 30, thereby to change the storage device to which a virtual storage area to be provided to a host is allocated.

The configuration information about the storage virtualization apparatus (for example, array disk switch) group described in Patent Reference 1 is managed independently for each storage virtualization apparatus.

In such a storage virtualization system, the modification of the configuration information during system operation changes the destination during input-output processing and causes data corruption and an input-output fault. Accordingly, a method for reducing the storage virtualization apparatuses that operate concurrently during a configuration change to only one apparatus can be considered, but a problem that concentration of a load or fault tolerance decreases is arisen. The aforementioned Patent Reference 1 does not refer to the modification of configuration information indicating that one volume shifts to another volume while the storage device system is operating.

BRIEF SUMMARY OF THE INVENTION

An object of the present invention is to prevent data corruption and an input-output fault during system operation and change the configuration information about a storage virtualization apparatus in a storage system having a virtualization apparatus of redundant configuration.

The present invention is constructed in a plurality of virtualization apparatuses that process input-output to/from a host processor to a virtual volume on the condition that a request for temporarily holding the input-output processing accepted from the host processor after a certain point of time is issued to the plurality of virtualization apparatuses and a report indicating that the ongoing input-output processing was completed in regard to this request was received from each virtualization apparatus. On the condition, the present invention releases an input-output state held temporarily after having changed the allocation of the storage area of a storage device to each virtualization apparatus and having accepted a completion report of the allocation change from each virtualization apparatus.

As a desirable example concerning a storage system, the storage system having a storage device that can specify a plurality of storage areas and a plurality of virtualization apparatuses that allocate a storage area which this storage device has, form a plurality of virtual volumes, process the input-output from a host processor to one of the virtual volumes, and includes a configuration change controller for changing an allocation configuration of storage area of the storage device to the virtual volume. The configuration change controller has a means for requesting a temporary hold of the input-output to all the virtualization apparatuses before a configuration change and a means for allowing all the virtualization apparatuses that received this request to complete the input-output being processed and to subsequently shift to a state of temporarily holding an input-output request from the host processor subsequently, then to return a completion report to the configuration change controller. The configuration change controller has, when receiving the completion report from the previous plural virtualization apparatuses to which a request was issued, a means for instructing an allocation change of the storage area of the storage device to the virtual volume to the virtualization apparatus.

Further, as a desirable example regarding a plurality of virtualization apparatuses, they have a configuration change control program for changing a configuration of associating a virtual volume with a storage area that becomes a real area of the storage device and a first processor that executes the configuration change control program. This configuration change control program has, before changing the configuration of associating the virtual volume with the storage area that becomes the real area of the storage device, a means for requesting an input-output temporary hold to another virtualization apparatus. The other virtualization apparatus that received the request has a means for completing the input-output being processed and subsequently shifting to a state of temporarily holding an input-output request from a host processor, and returning a completion report. The configuration change control program has, when receiving the completion report from the other virtualization apparatus, a means for instructing an allocation change of the storage area of the storage device to the virtual volume to the other virtualization apparatuses, a means for receiving the completion report of the allocation change from another virtualization apparatus, and a means for sending an instruction for releasing the state of the input-output held temporarily to the other virtualization apparatus.

Furthermore, as an example of the configuration concerning a storage device, the storage device has a plurality of storage areas for providing a real storage area and a virtualization apparatus that allocates the plurality of storage areas, forms a plurality of virtual volumes, and processes the input-output from a host processor to one of the virtual volumes.

This virtualization apparatus has, before changing a configuration of associating the virtual volume with the storage area that becomes a real area of the storage device, a means for requesting an input-output temporarily hold to another virtualization apparatus. The other virtualization apparatus that received the request has a means for completing the input-output being processed and subsequently shifting to a state of temporarily holding an input-output request from the host processor, and returning a completion report. The virtualization apparatus has, when receiving the completion report from the other virtualization apparatus, a means for instructing an allocation change of the storage area in regard to the virtual volume to the other virtualization apparatus, a means for receiving the completion report of the allocation change from the other virtualization apparatus, and a means for sending an instruction for releasing the state of the input-output held temporarily to the other virtualization apparatus.

As a more desirable example, data can migrate from one storage device to another storage device during system operation by copying the data between the storage devices synchronizing with the change of configuration information. Moreover, even a virtualization apparatus not having a copy function can migrate data by allowing the storage device to implement a configuration change control function and the aforementioned copy processing function.

According to the present invention, the configuration information of a virtual volume can be changed during system operation by preventing as much influence of an input-output temporary hold as possible. Consequently, data can migrate from one storage device to another storage device during system operation. Moreover, even a virtualization apparatus not having the copy function can shift data. A storage device that can change an allocation destination of the virtual volume can be realized during operation in a redundant configuration.

BRIEF DESCRIPTION OF THE DRAWINGS

Preferred embodiments of the present invention will be described in detail based on the followings, wherein:

FIG. 26 is a drawing for describing an operation principle of data migration in the fourth embodiment;

DETAILED DESCRIPTION OF THE INVENTION

Embodiments of the present invention will be described below with reference to the drawings.

First, a first embodiment is described with reference to FIGS. 1 to 8.

Figure 1:
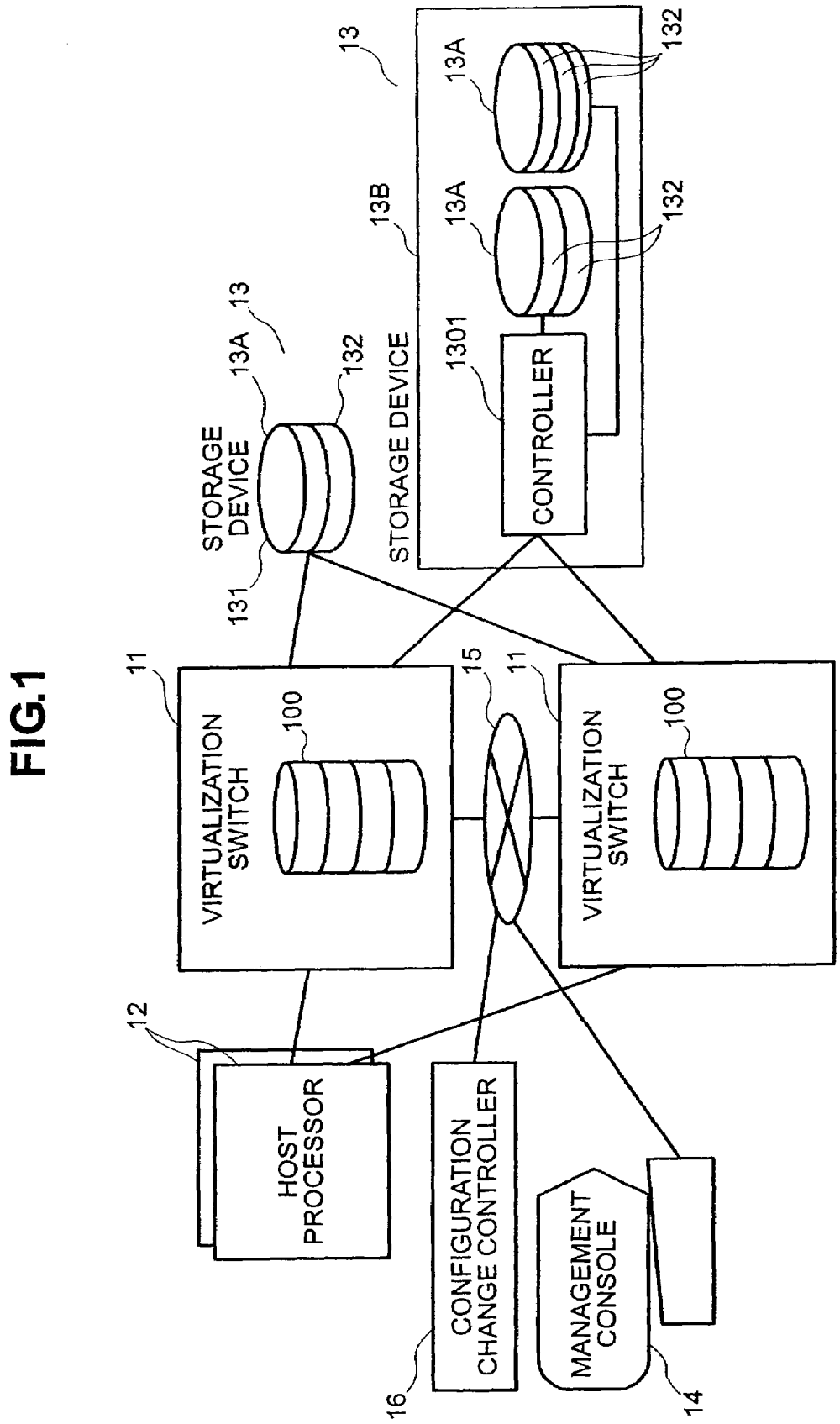
FIG. 1 is a drawing showing the overall configuration of a storage system according to a first embodiment.

FIG. 1 is a drawing showing the overall configuration of a storage system.

The storage system connects at least one host processor 12, a plurality of storage devices 13, a plurality of virtualization switches 11, a configuration change controller 16, and a management console 14 to a network 15 such as a LAN.

The host processor 12 is a computer that uses data stored in the storage device 13. The host processor 12 may be a file server having a function provided to another computer that does not connect a storage area which the virtualization switch 11 provides to the virtualization switch 11.

The storage device 13 is provided with a memory unit 13a or a memory unit system 13b. In this case, the memory unit 13a is a single memory unit such as a hard disk drive or a DVD drive. The memory unit system 13b is a storage subsystem having the plural memory units 13a and a controller 1301 that controls these memory units. A memory unit 131 constructs the storage area of the memory unit 13a as a logical unit (hereafter referred to as an "LU") 131. The LU 131 is a logical storage area, and the device connected to the storage device 13 such as the host processor 12, is recognized as one logically independent storage device.

Further, the logical unit 131 is provided with a plurality of partly logical storage areas (hereafter referred to as "real areas") 132. Each of the real areas 132 corresponds to a physical storage area which the storage device 13 has. The size of the real area 132 is arbitrary and the range is an area having a continuous address.

The virtualization switch 11 is connected to another device through a communication line or by a switch as shown in the drawing and can communicate with another device. Further, the virtualization switch 11 is a virtualization apparatus that collects ("virtualizes") the storage areas which the plural storage devices 13 connected to the virtualization switch 11 itself has as one or more storage areas. Then the virtualization switch 11 provides a virtualized storage area to the host processor 12 connected to the virtualization switch 11. The virtual storage area which the virtualization switch 11 provides to the host processor 12 is hereafter referred to as a virtual volume 100.

A protocol such as a fibre channel, is used in the communication line or switch used between the virtualization switch 11 and the host processor 12 and between the virtualization switch 11 and the storage device 13. In this case, the communication line or switch used may be the communication line or protocol used in a local area network. The virtualization switch 11 is connected between the host processor 12 and the storage device 13 and has a function of transferring a command the host processor 12 issues to the side of the storage device 13.

The virtual volume 100 is a virtualized storage area having at least the one real area 132. The virtualization switch 11 can provide at least one virtual volume 100 to the host processor 12. A unique identifier (hereafter referred to as a "virtual volume identifier") is assigned to each virtual volume 100 in the virtualization switch 11 for specifying a virtual volume. Moreover, a continuous address is assigned to the storage area of each virtual volume 100. The host processor 12 specifies an address indicating a virtual volume identifier and a location in the virtual volume 100 and accesses data stored in the storage device 13 instead of directly specifying the real area 132 within the LU 131 of the storage device 13.

The management console 14 is such a personal computer (PC) that is used by a system administrator to create the virtual volume 100 and has a display device or an input device, and a memory. The management console 14 is connected to the virtualization switch 11 via the LAN 15 and can communicate with each other.

The configuration change controller 16 controls the virtualization switch 11 and controls configuration information, that is, the change of associating the virtual volume 100 with the real area 132. The configuration change controller 16 can have a PC or a server, for example, and is connected to the virtualization switch 11 via the LAN 15, which can communicate with each other.

Figure 2:
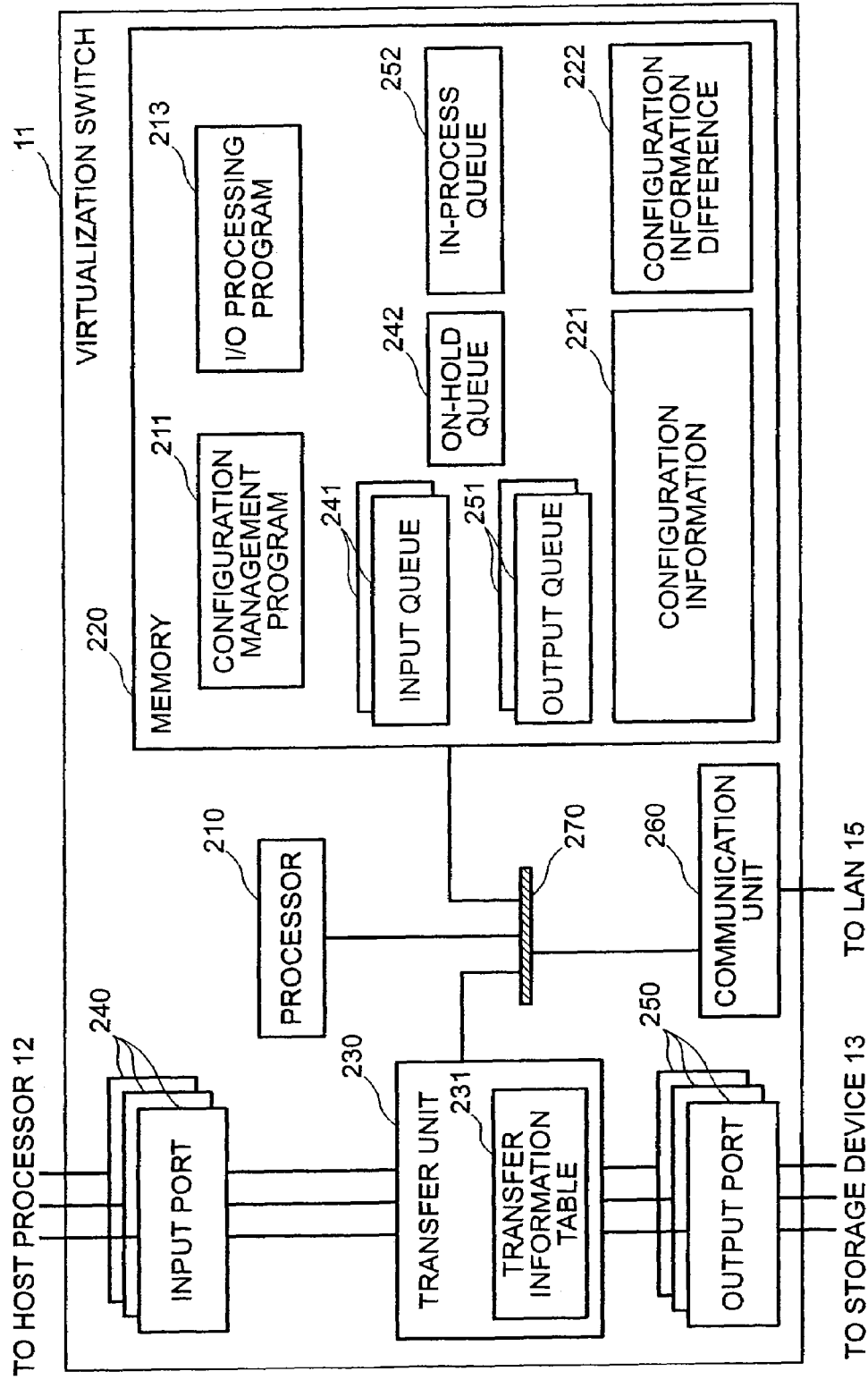
FIG. 2 is a drawing showing the internal configuration of a virtualization switch 11 of FIG. 1.

FIG. 2 shows the internal configuration of the virtualization switch 11 of FIG. 1.

The virtualization switch 11 is provided with an input port 240, an output port 250, a transfer unit 230, a processor 210, a memory 220, a bus 270, and a communication unit 260. The transfer unit 230, processor 210, memory 220, and communication unit 260 are all connected to the bus 270, and send and receive data to/from each other.

The input port 240 connects a communication line through which the virtualization switch 11 communicates with the host processor 12. The output port 250 connects a communication line through which the virtualization switch 11 communicates with the storage device 13. Further, the element constructing the input port 240 and the output port 250 may be located in the same hardware. In this case, the user selects which port is used as the input port or the output port.

The transfer unit 230 has an internal memory and holds a transfer information table 231 in the memory. The transfer information table 231 stores the interrelationship between the host processor 12 that can communicate with the virtualization switch 11 via each input port 240 and the storage device 13 that can communicate with the virtualization switch 11 via each output port 250.

The transfer unit 230 refers to the transfer information table 231 and transfers an input-output request received from the host processor 12 via the input port 240 to the output port 250 that is used for the communication between the storage device 13 and the virtualization switch 11 of a requesting destination. Further, the transfer unit 230 transports the response information or data received from the storage device 13 via the output port 250 to the input port 240 that is used for the communication between the host processor 12 and the virtualization switch 11 which ought to receive the information or data. When the input-output request received from the host processor 12 is an input-output request to the virtual volume 100, the transfer unit 230 enqueues the input-output request to an input queue 241 to be described later and requests the processing from the processor 210. Further, the transfer unit transfers the input-output request stacked on an output queue 251 to be described later to the storage device 13 via the output port.

The processor 210 executes a program stored on the memory 220 and performs the input-output processing or the change processing of the configuration information for the virtual volume 100 from the host processor 12.

The memory 220 stores the program the processor 210 executes and the information necessary for the execution. The program and data the memory 220 stores includes a configuration management program 211, an I/O processing program 213, the input queue 241, the output queue 251, a on-hold queue 242, a in-process queue 252, configuration information 221, and a configuration information difference 222.

The configuration management program 211 receives a request from the configuration change controller 16 and performs input-output temporary hold and restart processing or configuration information change processing.

The I/O processing program 213 processes the input-output processing for the virtual volume 100 from the host processor 12, that is, converts the input-output to the input-output for the storage device 13 and transfers it.

The input queue 241 allows the transfer unit 230 to stack the input-output request for the virtual volume 100. The output queue 251 stacks the input-output request for the storage device the I/O processing program 213 processed. The number of input queues 241 and the number of output queues 251 are optional.

The on-hold queue 242 stores the input-output request for the virtual volume 100 accepted when setting the virtualization switch 11 in a state (I/O temporary hold state) at which the input-output processing is held temporarily. The in-process queue 252 stores the input-output request for the virtual volume 100 processed by the virtualization switch 11 and transferred to the storage device 13 until the input-output is completed.

The configuration information 221 is the table for associating the virtual volume 100 with the real area 132. The configuration information difference 222 is a buffer that records the difference before and after the change when the configuration information 221 is changed.

In this embodiment, one each of the on-hold queue 242, in-process queue 252, configuration information 221, and configuration information difference 222 is provided for every virtualization switch 11.

The communication unit 260 enables the processor 210 to communicate with the configuration change controller 16 and the management console 14 via the LAN 15.

Figure 3:
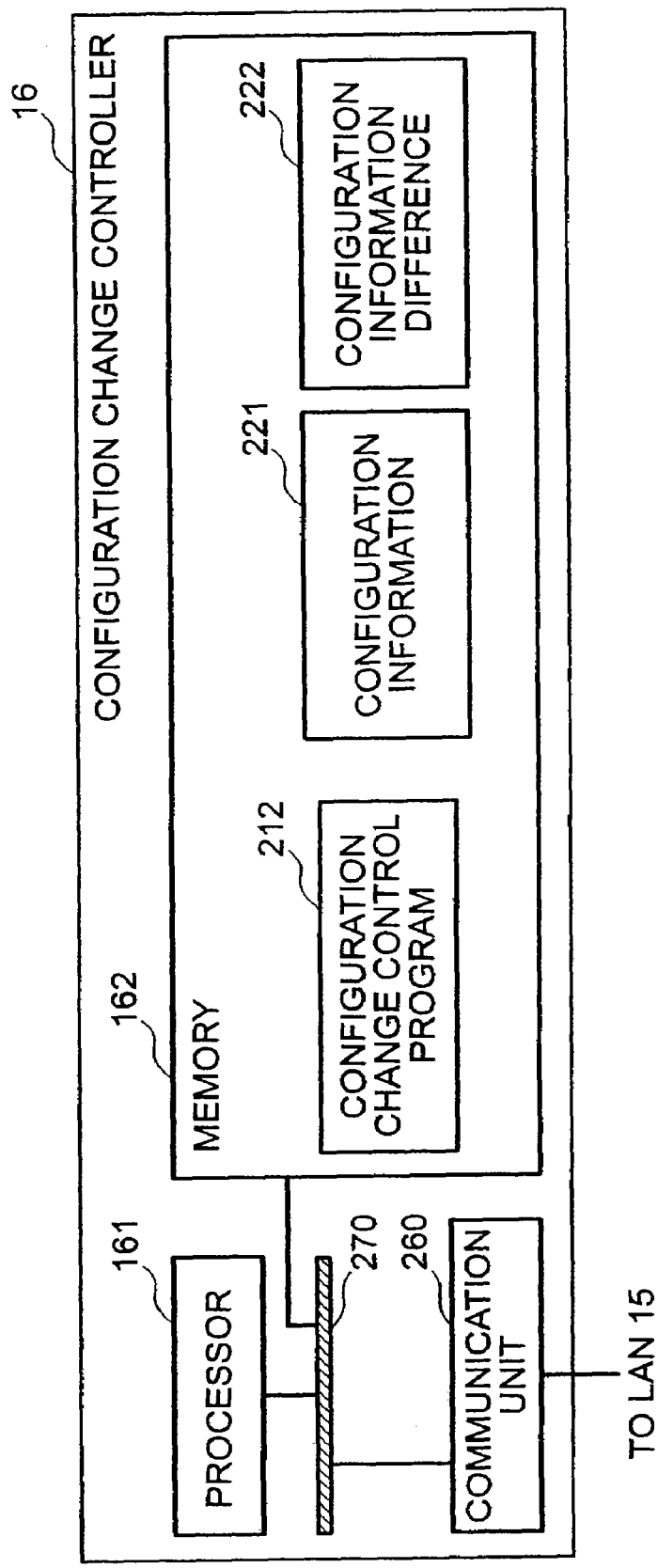
FIG. 3 is a drawing showing the internal configuration of a configuration change controller 16 of FIG. 1.

FIG. 3 shows the internal configuration of the configuration change controller 16 of FIG. 1.

The configuration change controller 16 is a management server, for example, and is provided with a processor 161, a memory 162, the bus 270, and the communication unit 260. The processor 161, memory 162, and communication unit 260 are all connected to the bus 270, and send and receive data one after another.

The processor 161 executes the program stored on the memory 162 and controls the configuration change of the virtualization switch 11.

The memory 162 stores the program the processor 161 executes or the information necessary for the execution. The program and data the memory 162 stores includes the configuration change control program 212, configuration information 221, and configuration information difference 222.

The configuration change control program 212 controls the configuration change of the virtualization switch 11.

Figure 4:
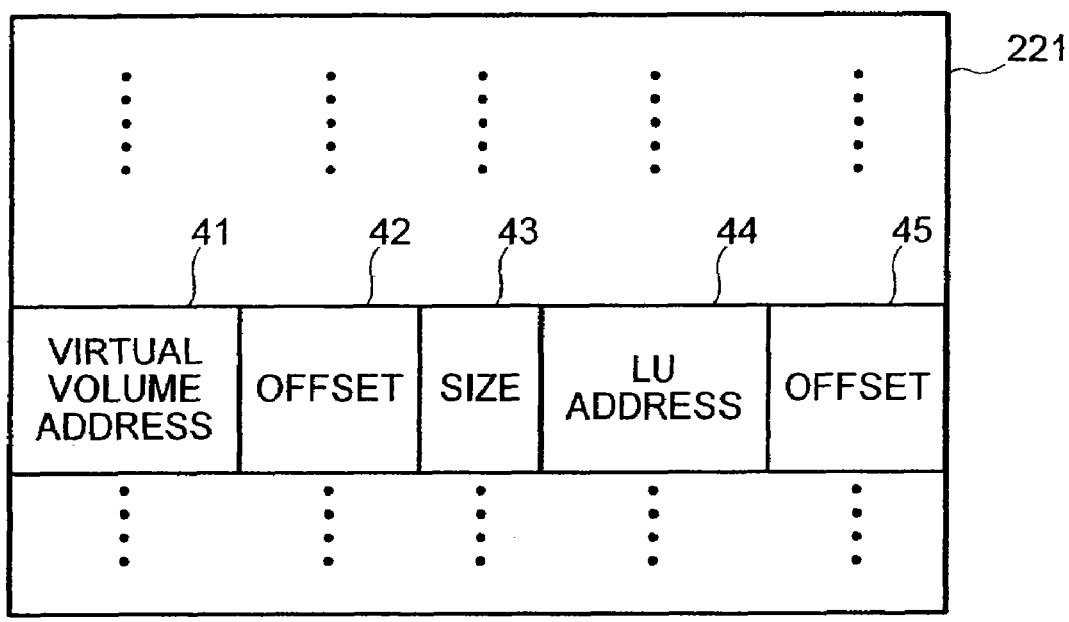
FIG. 4 is a drawing showing the table of a configuration information 221 in the storage system.

FIG. 4 shows the table of the configuration information 221 in a storage system.

The configuration information table 221 is provided in the virtualization switch 11 and the configuration change controller 16.

The configuration information 221 is provided with entries that include a virtual volume address 41, an offset 42, a size 43, an LU address 44, and an offset 45. Each entry is associated with a real area 132 and a partial area on the virtual volume 100 to which the real area 132 is allocated. The LU address 44 indicates the information for allowing the virtualization switch 11 to identify the LU 131 including the real area 132 that corresponds to the entry. The offset 45 indicates the start address on the LU 131 of the real area 132, and the size 43 indicates the size of the real area 132.

The virtual volume address 41 indicates the information for allowing the host processor 12 to identify the virtual volume 100, and the offset 42 indicates the start address on the virtual volume 100 of the partial area that corresponds to the entry. The virtual volume address 41 and the LU address 44 specifically use a pair of a WWN (World Wide Name) or port ID, and a LUN (Logical Unit Number) of a fibre channel.

Figure 5:
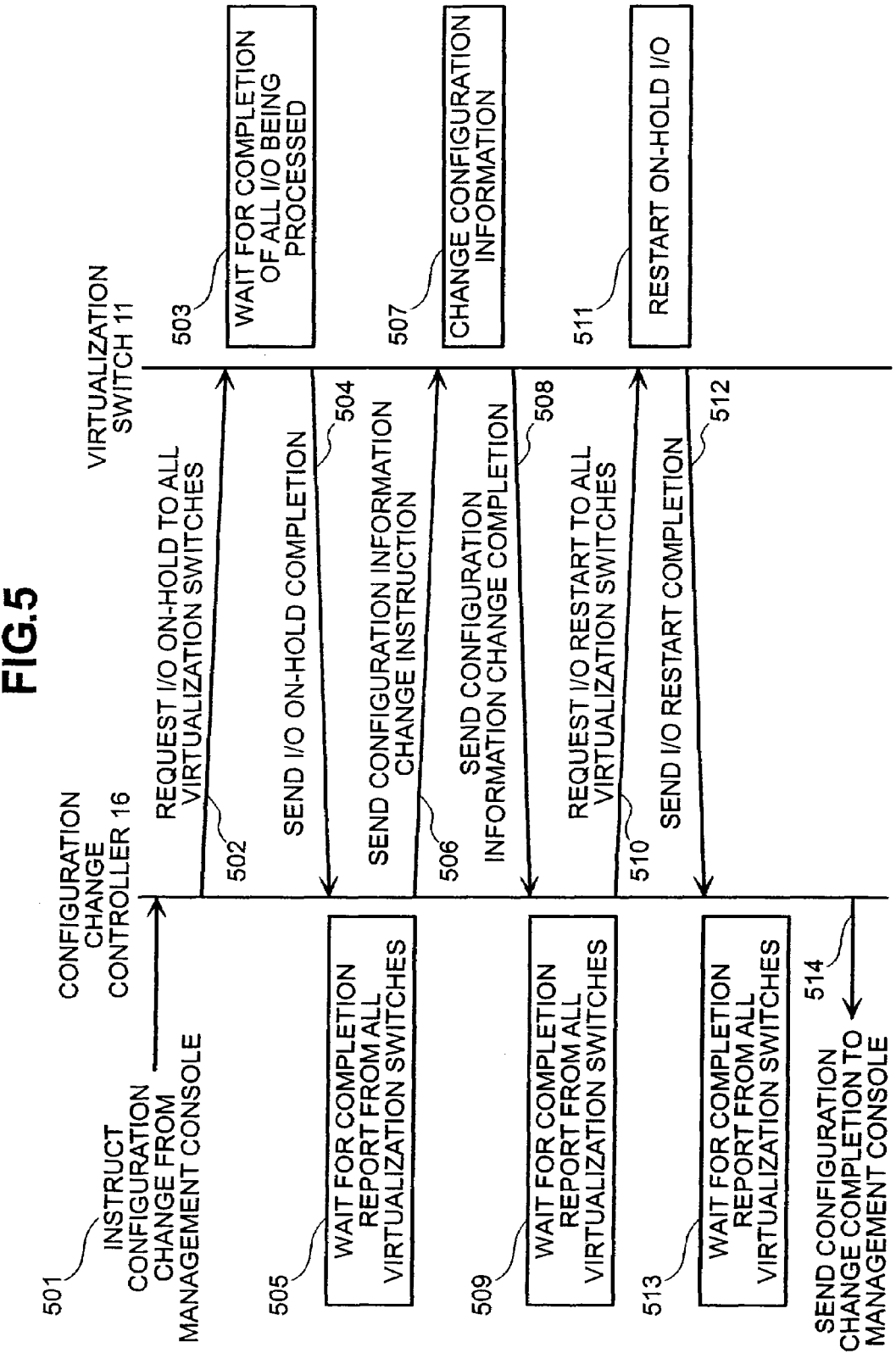
FIG. 5 is a drawing showing the communication protocol between a configuration change controller 16 and a virtualization switch 11 in the storage system of FIG. 1.

Next, the configuration change in this storage system is described briefly with reference to FIG. 5. FIG. 5 shows the communication protocol between the configuration change controller 16 and the virtualization switch 11 in the storage system.

When an instruction of a configuration information change request is input from the management console 14, the instruction is transferred to the configuration change controller 16 (501). Then the processing of steps 502 to 505 is executed and the input-output processing issued by the host processor 12 is held temporarily. This is because a conflict occurs if the input-output being processed exists before and after a configuration change. If the configuration information is changed during input-output processing in this manner, the input-output cannot be associated with the correct real area 132 and it may cause a data corruption. This data corruption is prevented from the following processing.

That is, the configuration change controller 16 that received a configuration instruction issues a request that temporarily holds the input-output processing (I/O temporary hold request) to all virtualization switches 11 (502). The virtualization switch 11 that received this hold request holds the input-output being processed and subsequent input-output processing temporarily and waits for the execution completion of the input-output being processed (503). After the execution is completed, the completion of the processing of the step 503 (I/O temporary hold completion report) is reported to the configuration change controller 16 (504). Subsequently, the configuration change controller 16 waits for the completion report from all the virtualization switches 11 (505).

The aforementioned processing enabled the change of configuration information. Subsequently, the processing of steps 506 to 509 is executed and the configuration information of all the virtualization switches 11 is changed collectively. This is because of the possibility of data corruption occurring when the input-output that corresponds to the same virtual volume is associated with the different real area 132 by the virtualization switch 11 in charge of processing if the consistency of the configuration information which the virtualization switch 11 has is not obtained.

The configuration change controller 16 sends a configuration information difference and a configuration information change request that used the difference to all the virtualization switches 11 (506). The virtualization switch 11 that received the request changes the configuration information (507). Then after the configuration change was completed, the virtualization switch reports the completion of the configuration information change to the configuration change controller 16 (508). Subsequently, the configuration change controller 16 waits for the completion report from all the virtualization switches 11 (509).

Finally, the processing of steps 510 to 513 is executed and the input-outputs held temporarily in the step 503 begin being restarted.

The configuration change controller 16 issues a request (I/O restart request) that restarts the input-output processing held temporarily to all the virtualization switches 11 (510). The virtualization switch 11 that received the request restarts the input-outputs that are held temporarily (511). Then the virtualization switch reports the completion of the restart processing to the configuration change controller 16 (512). Subsequently, the configuration change controller 16 waits for the completion report from all the virtualization switches 11 (513) and reports the completion to a management console (514).

The configuration change is enabled without generating a conflict of the configuration information during input-output processing (that is, system operation) or a conflict of the configuration information between the plural virtualization switches 11 in this manner.

Figure 6:
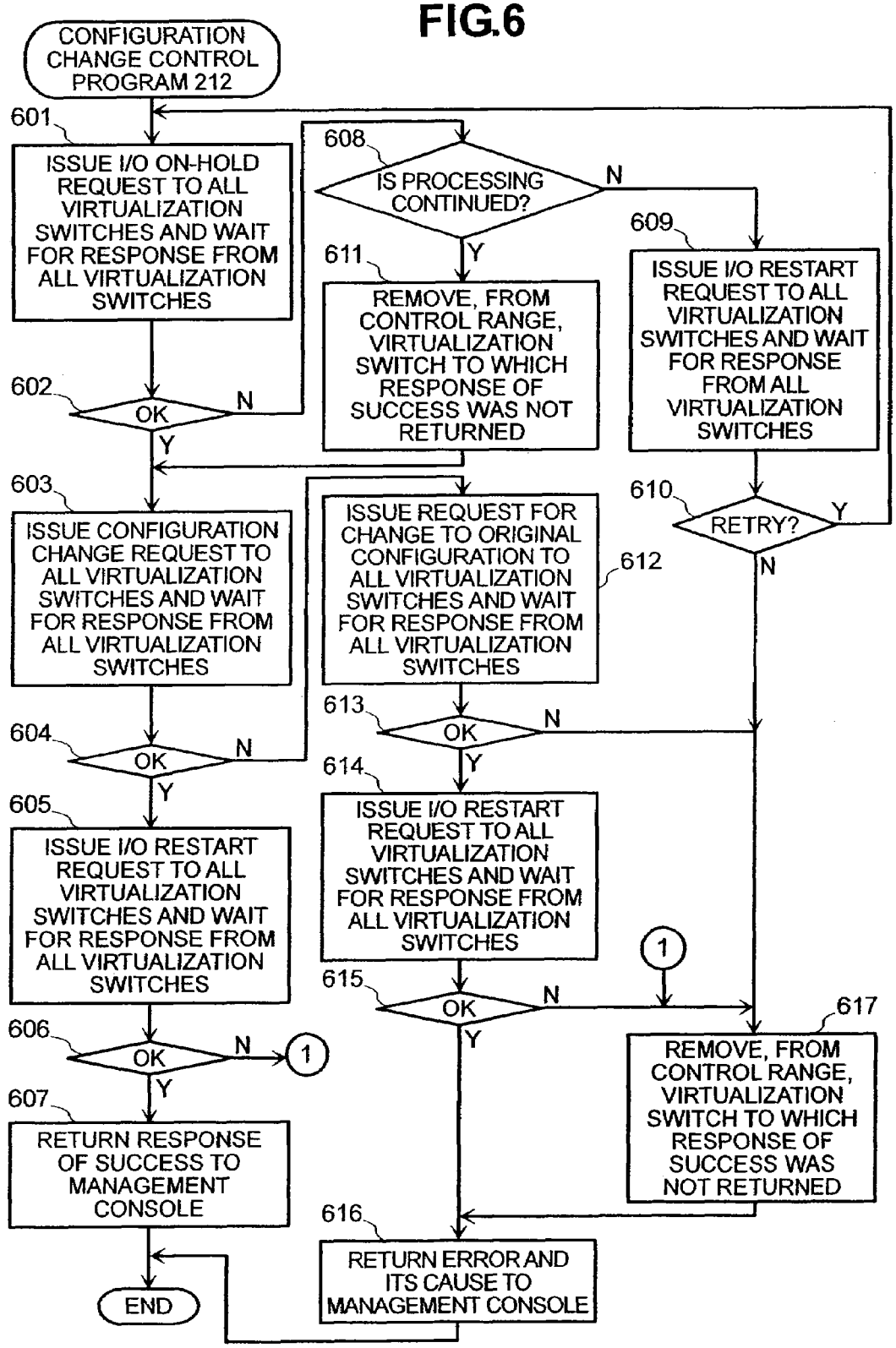
FIG. 6 is a flowchart showing the processing of a configuration change control program 212 in a configuration change controller 16.

Next, the processing operation of the configuration change control program 212 in the configuration change controller 16 is described with reference to FIG. 6.

First, the processor 161 issues an I/O temporary hold request to all the virtualization switches 11 and waits for a completion report from all the virtualization switches 11 (601). When queuing was completed normally (602 "Y"), the change of the configuration information 221 is enabled. In this case, the processor 161 sends a configuration change request and the configuration information difference 222 to all the virtualization switches 11 and changes the configuration information 221. Then the processor waits for the completion report from all the virtualization switches 11 (603). When the queuing was completed normally (604 "Y"), the configuration information 221 is changed normally. Accordingly, to restart the input-output being held, the processor 161 sends an I/O restart request to all the virtualization switches 11 and waits for the completion report from all the virtualization switches 11 (605). When the queuing is completed normally (606 "Y"), the processor determines that all change processing has succeeded and returns a message indicating that the processing succeeded to the management console 14 (607). The aforementioned is a flow of the normal processing of the configuration change control program 212.

On the other hand, when the virtualization switch 11 did not complete an I/O temporary hold request (602 "N"), it determines whether subsequent processing continues or not (608).

In this embodiment, when there are two or more of virtualization switches 11 to which a response of success was returned, the processing continues (608 "Y"). To prevent the virtualization switch 11 to which the response of success was not returned from being used, the virtualization switch is removed from a control range (611) and the processing continues from the step 603. When several virtualization switches 11 are removed from the control range in the step 611, they are utilized based on the incorrect configuration information 221 if the input-output of these virtualization switches 11 is restarted incorrectly. Accordingly, the processor 161 reports the virtualization switch 11 that was removed from the control range to the management console 14 in the step 607 and displays a message indicating "Several virtualization switches were stopped because the synchronization of the input-output temporary hold failed and configuration could not be changed during a configuration change" on the display device of the management console 14".

Further, when the processing does not continue (608 "N"), the processor 161 first sends an I/O restart request to all the virtualization switches 11 and waits for the completion report from all the virtualization switches 11 (609), then determines whether the processing of the step 601 and later steps is retried or not (610). In this case, when the error in the step 602 was a timeout, this timeout is considered to result from the fact that because the virtualization switch 11 is processing a large amount of input-output, their completion can hardly be waited for. Accordingly, because there is the possibility of this completion wait proving successful by a retry, the retry is performed only for a predetermined count in this embodiment if there are no other errors (610 "Y"). In the step 610 and later steps, the processor 161 repeats processing from the step 601.

On the other hand, when the processing is not retried (610 "N"), if there is the virtualization switch 11 to which a response of success was not returned in the step 609, this switch is removed from the control range (617). Then the occurrence of an error and its cause are reported to the management console 14 and the management console displays a message indicating "An input-output completion wait of a virtualization switch failed" (616). More desirably, the management console 14 displays a message prompting the administrator to "Retry a configuration change when the input-output frequency from the host processor 12 to the virtual volume 100 is low".

Further, when error detection, that is, the change of the configuration information 221 failed in the step 604, the processor 161 returns to the original configuration information 221 (612, 613) and restarts the input-output (614, 615). Then the processor reports the occurrence of an error and its cause to the management console 14, and, for example, displays a message indicating "The administrator failed in the change to the specified configuration information" (616).

When an error was detected in the processing of the steps 613 and 615 (for "N"), subsequent processing cannot continue. Accordingly, the processor 161 removes the virtualization switch 11 to which the response of success was not returned from the control range (617) and performs the processing of the step 616. For example, the processor displays a message indicating "The administrator failed in the change to the configuration information and failed in even recovery processing". The processor 161 controls the change of the configuration information 221 as described above.

Next, the processing operation of the configuration management program 211 in the virtualization switch 11 is described with reference to FIG. 7.

The configuration management program 211 is called when the virtualization switch 11 received any of an I/O temporary hold request, an I/O restart request, and a configuration information change request from the configuration change controller 16. First, when the processor 210 received the I/O temporary hold request (701 "Y"), the processor calls the I/O processing program 213 and sets the I/O in a temporary hold state (702). Then when the transition to the temporary hold state succeeded (703 "Y"), the processor 210 returns a response of success to the processor 161 that executes the configuration change program 212 (704).

Next, when the processor 210 receives the configuration information change request (705 "Y"), the processor 210 confirms that the I/O is set in the temporary hold state (706). This is because the processor 210 does not change the configuration information 221 incorrectly during input-output processing. Further, the processor 210 changes the configuration information 221 (707). As a result, when the processor 210 was able to change the configuration information normally (708 "Y"), the processor executes the processing of the step 704.

Moreover, when the processor 210 received the I/O restart request (709 "Y"), the processor confirms that the I/O is set in the temporary hold state (710). As a result, when the I/O is set in the hold state (710 "Y"), the processor 210 calls the I/O processing program 213 and releases the I/O temporary hold state, then restarts input-output (711). When the processor 210 was able to change the configuration information normally (712 "Y"), the processor executes the processing of the step 704. The aforementioned is the normal path of the configuration management program 211.

On the other hand, the configuration management program goes to an abnormal path if No ("N") is selected in the steps 703, 706, 708, 710, and 712. In any case, an error and its cause are returned to the processor 161 (713).

The processor 210 can change the configuration information 221 in accordance with the instruction of the configuration change controller 16 by executing the configuration management program 211 in this manner.

Next, the processing operation of the I/O processing program 215 in the virtualization switch 11 is described with reference to FIG. 8.

The I/O processing program 213 is called when an input-output request was enqueued to the input queue 241, when the input-output request of the in-process queue 252 was completed, when the I/O shifts to a temporary hold state by the processing of the configuration management program 211, and when the I/Os temporary hold state are release according to the I/O restart request.

When the input-output request enqueued to the input queue 241 (801), the processor 210 processes the input-output request when the I/O is not set in the temporary hold state (802 "N"). That is, the processor 210 converts the address of the virtual volume 100 to the address of the LU 131 with reference to the configuration information 221 and enqueues the input-output request to the output queue 251 (hereafter referred to as the fact that the input-output request was processed). Then the processor enqueues the output-output request to the in-process queue 252 (803). Subsequently, the processor 210 executes an event wait (804) and waits for the following activation cause.

On the other hand, when the I/O is set in the temporary hold state (802 "Y"), the processor 210 enqueues the input-output request to the on-hold queue 242 (805) and executes the processing of the step 804 and later steps.

When the processor 210 completed the input-output request of the in-process queue 252 (807 "Y"), the processor dequeues the input-output request from the in-process queue 252 (808). Then the processor confirms whether the I/O is set in the temporary hold state or not (809). If the I/O is not set in the temporary hold state (809 "N"), the processor 210 executes the processing of the step 804 and later steps.

On the other hand, when the I/O is set in the temporary hold state (809 "Y"), the processor 210 verifies the in-process queue 252 (810). As a result of the verification, when the in-process queue 252 was empty (810 "Y"), the processor reports the transition completion to an I/O hold state to the configuration management program 211 (811) and completes the processing. To the contrary, when the in-process queue 252 is not empty (810 "N"), the processor 210 repeats the processing from the step 804.

When the I/O shifts to the temporary hold state (812 "Y"), the processor 210 stores that the I/O was set in the temporary hold state (813, 814) and continues the processing from the step 810.

Further, when receiving the restart request (815 "Y"), the processor confirms whether the I/O is set in the temporary state or not (816). As a result of the confirmation, if the I/O is set in the hold state, the processor releases the I/O temporary hold state and processes the input-output of the on-hold queue 242, then enqueues to the in-process queue 252 (817). Then when the in-process queue was enqueued normally (818 "Y"), the processor executes the processing of the step 811 (that is, completion report). The aforementioned is the processing when the I/O processing program 213 was executed normally.

To the contrary, if the processing of the I/O processing program 213 is not normal, it indicates that No ("N") was selected in the steps 814, 816, 818. In these cases, because any processing cannot continue, an error and its cause are returned to the configuration management program 211 (819).

In this embodiment, the input-output processing during the change of the configuration information 221 that causes data corruption is prevented in the step 610 when the configuration change control program 212 is executed and a conflict of the configuration information 221 between the virtualization switches 11 that causes the data damage is prevented in the step 603 in the same manner.

Next, a second embodiment is described with reference to FIGS. 9 to 11.

Figure 9:
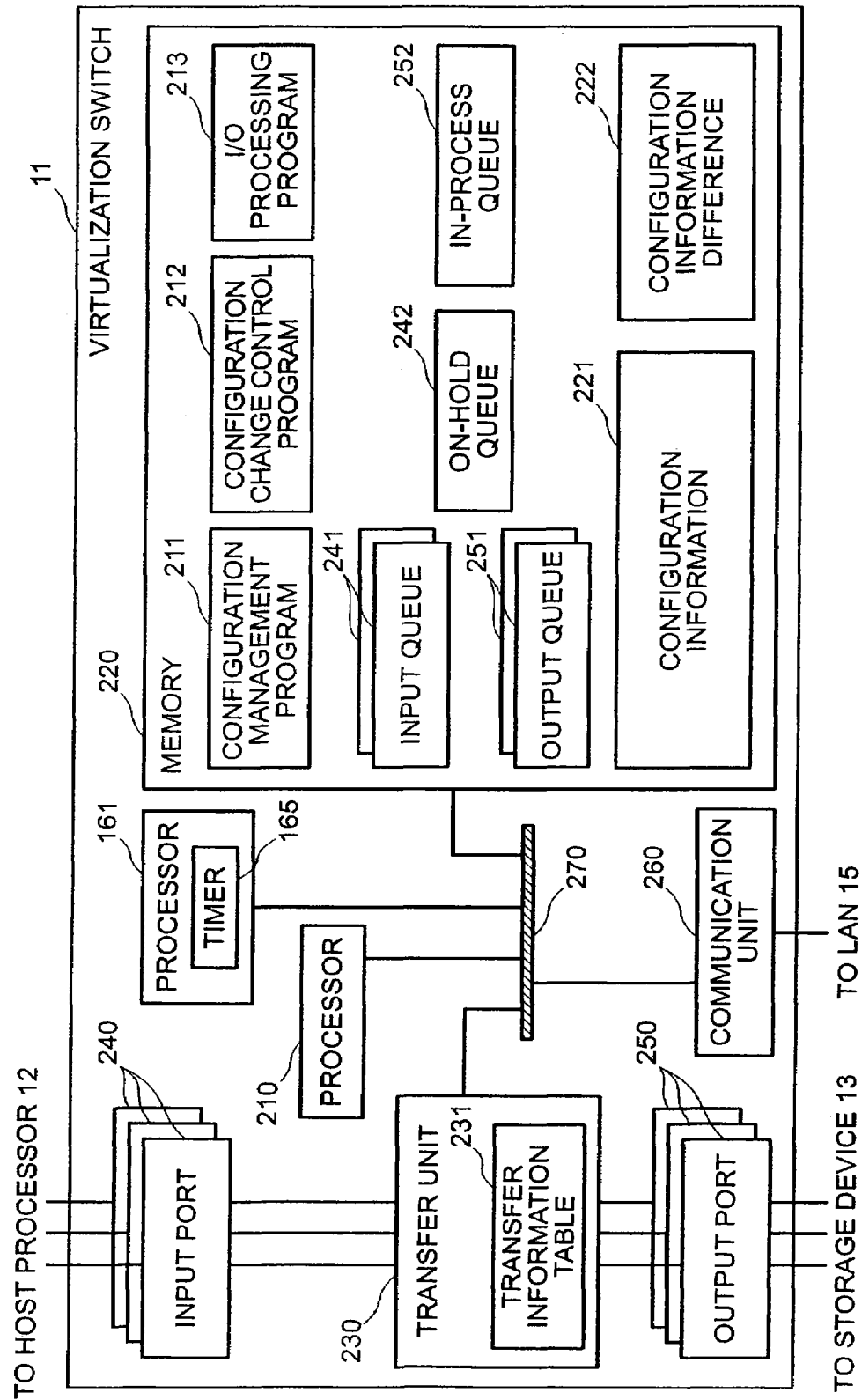
FIG. 9 is a drawing showing the internal configuration of the virtualization switch 11 according to a second embodiment.

FIG. 9 shows the internal configuration of the virtualization switch 11 in a storage system.

FIG. 9 differs from the virtualization switch 11 shown in FIG. 2 in that the processor 161 connected to the bus 270 is provided, the configuration change control program 212 is stored in the memory 220, and the processor 161 executes this configuration change control program 212. In this case, the processor 161 is provided with a timer 165, and the processing of the configuration change control program 212 is activated periodically by this timer 165. The timer 165 may be a timer realized by software.

According to this embodiment, the virtualization switch 11 can function as the configuration change controller 16 by incorporating the configuration change control program 212 and the processor 161 in the virtualization switch 11 (the virtualization switch 11 that functions in this manner is also hereafter referred to as the configuration change controller 16). When the plural virtualization switches 11 are provided, they are all provided with the aforementioned configuration and can function as the configuration change controller 16. If all the virtualization switches 11 are provided with the configuration change control program 212 and the processor 161 in this manner, the configuration change controller 16 in the system shown in FIG. 1 becomes necessary.

The processor 210 provided in the virtualization switch 11 can use the function of the processor 161 simultaneously.

Figure 10:
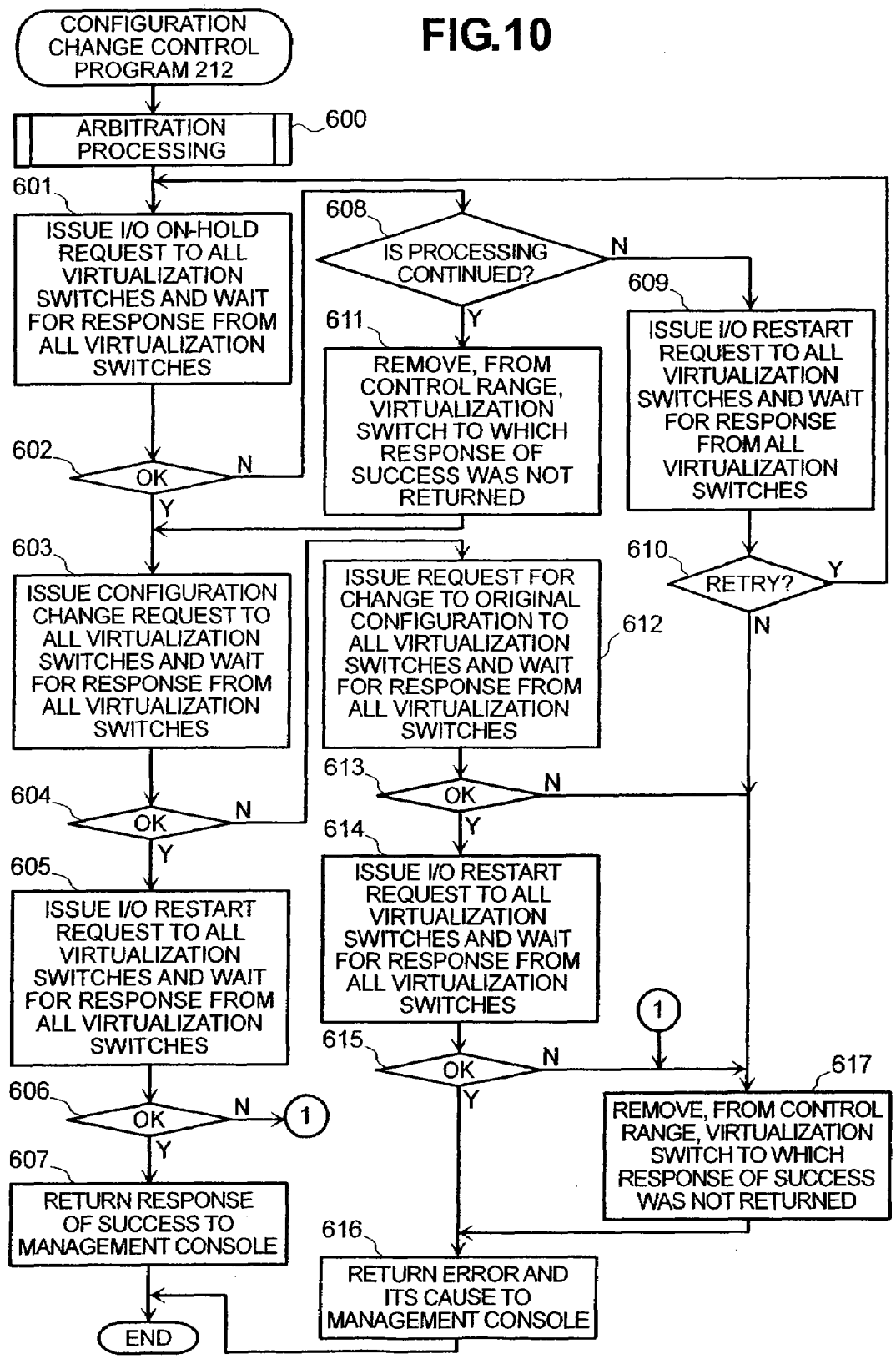
FIG. 10 is a flowchart showing the processing of a configuration change control program 212 in the second embodiment.

FIG. 10 shows the processing of the configuration change control program 212 in the second embodiment. FIG. 10 differs from FIG. 6 in that arbitration processing 600 is included as the processing operation of FIG. 10. FIG. 11 shows a detailed flow of the arbitration processing 600.

The arbitration processing 600 limits, among the plural processors 161 that correspond to the plural virtualization switches 11, processors (hereafter referred to as a processor having a master right) that executes the processing of the step 601 and later steps to one processor. In this embodiment, the configuration change control program 212 is also activated by receiving a monitoring packet from another configuration change control program 16 (incorporated in the virtualization switch 11) and the timer 165 in addition to a configuration change request from the management console 14.

Figure 11:
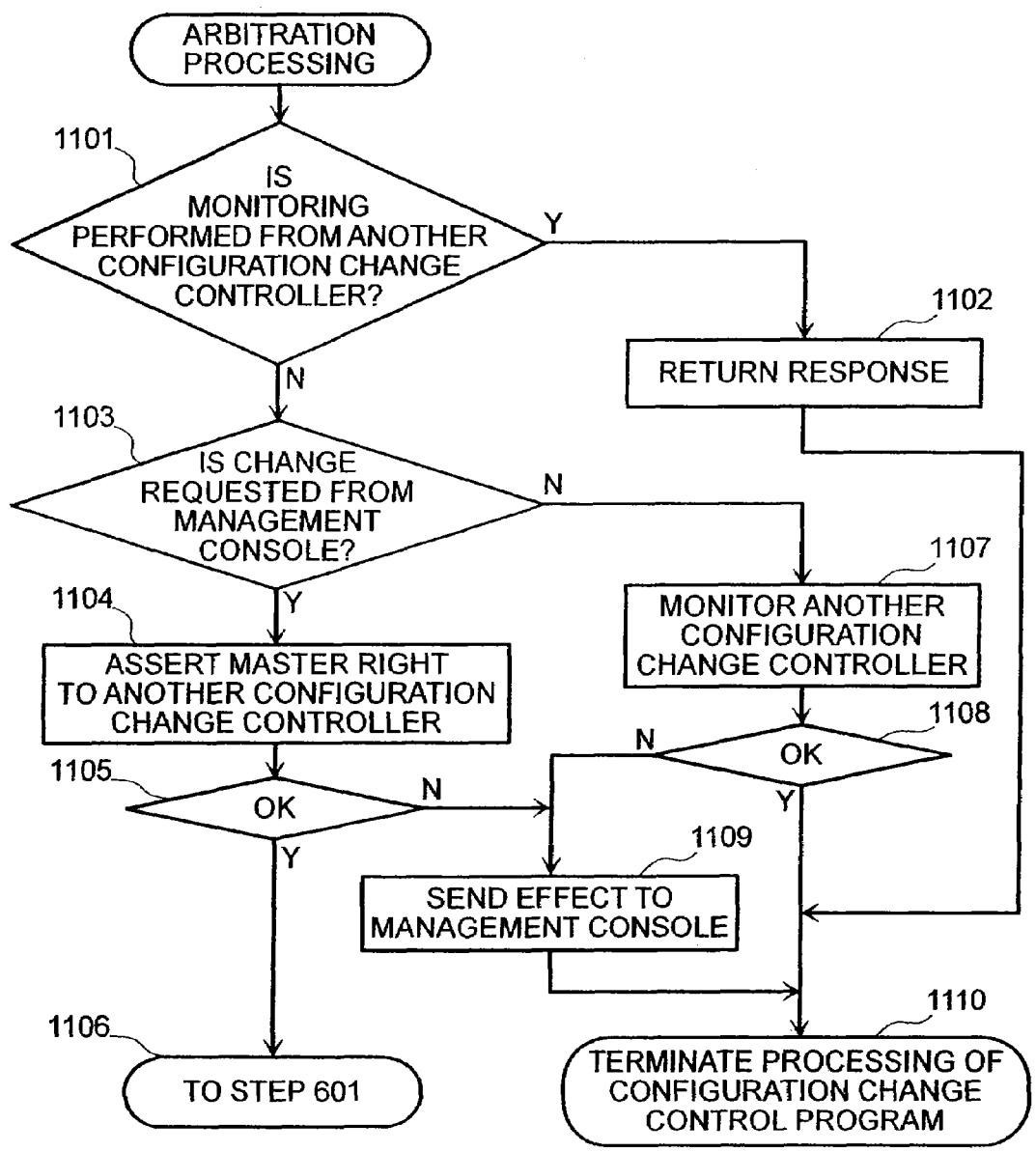
FIG. 11 is a flowchart showing the processing operation of arbitration processing 600 in FIG. 10.

In the flowchart of FIG. 11, first, when the processor 161 received a monitoring packet (1101 "Y"), the processor returns a response packet to the configuration change controller 16 that sent this monitoring packet (1102), completes the arbitration processing, and also completes the processing of the configuration change control program 212 (1110).

The monitoring packet and the response packet include the ID of the sent configuration change controller 16 and the ID (hereafter referred to as the ID of a controller having a master right) of the configuration change controller 16 that incorporates the processor having the master right. These identifiers identify the configuration change controller 16. For example, the identifiers are IP addresses which the communication unit 260 has. When the processor 161 received a configuration change request from a management console (1103 "Y"), the processor 161 asserts the master right to another configuration change controller 16, that is, the processor 161 sends the monitoring packet in which the ID of the local configuration change controller 16 was recorded as the ID of the controller having the master right to all the configuration change controllers 16 and waits for a response (1104). For a normal end, that is, when the processor did not receive the response packet that has the ID other than the local configuration change controller 16 as the ID of the controller having the master right (1105 "Y"), the processor completes processing and shifts to the processing of the step 601 of the configuration change control program 212 (1106).

In the step 1103, when the program was called with the timing of the timer 165, the processor 161 monitors the remote configuration change controller 16, that is, sends the monitoring packet to the controller having the master right (1107). For the normal end, that is, when the processor received the response packet that has the ID of the controller as the ID of the controller having the master right (1108 "Y"), the processor advances to the processing of step 1110 and completes the processing. The aforementioned is the normal case of the arbitration processing.

To the contrary, for abnormal processing, that is, when negation ("N") was selected in the steps 1105, 1108, because there is another controller having the master right, the processor sends notice as such to the management console 14 (1109), the processor goes to the processing of the step 1110 and completes the processing.

Because another processing operation is the same as the aforementioned first embodiment, the description is omitted.

Thus, according to the second embodiment, the controller having the master right is limited to only the controller 16 that received a configuration change request from the management console 14 at first by the processing of the steps 1104, 1102. That is, even if the plural processors 161 execute the configuration change control program 212 in a system, they can change the configuration information 221 without generating a conflict.

When a fault occurred in the controller 16 having the master right, the system administrator can identify this fault via the management console 14 through the processing of the steps 1107, 1102.

Next, a third embodiment is described with reference to FIGS. 12 to 18.

Figure 12:
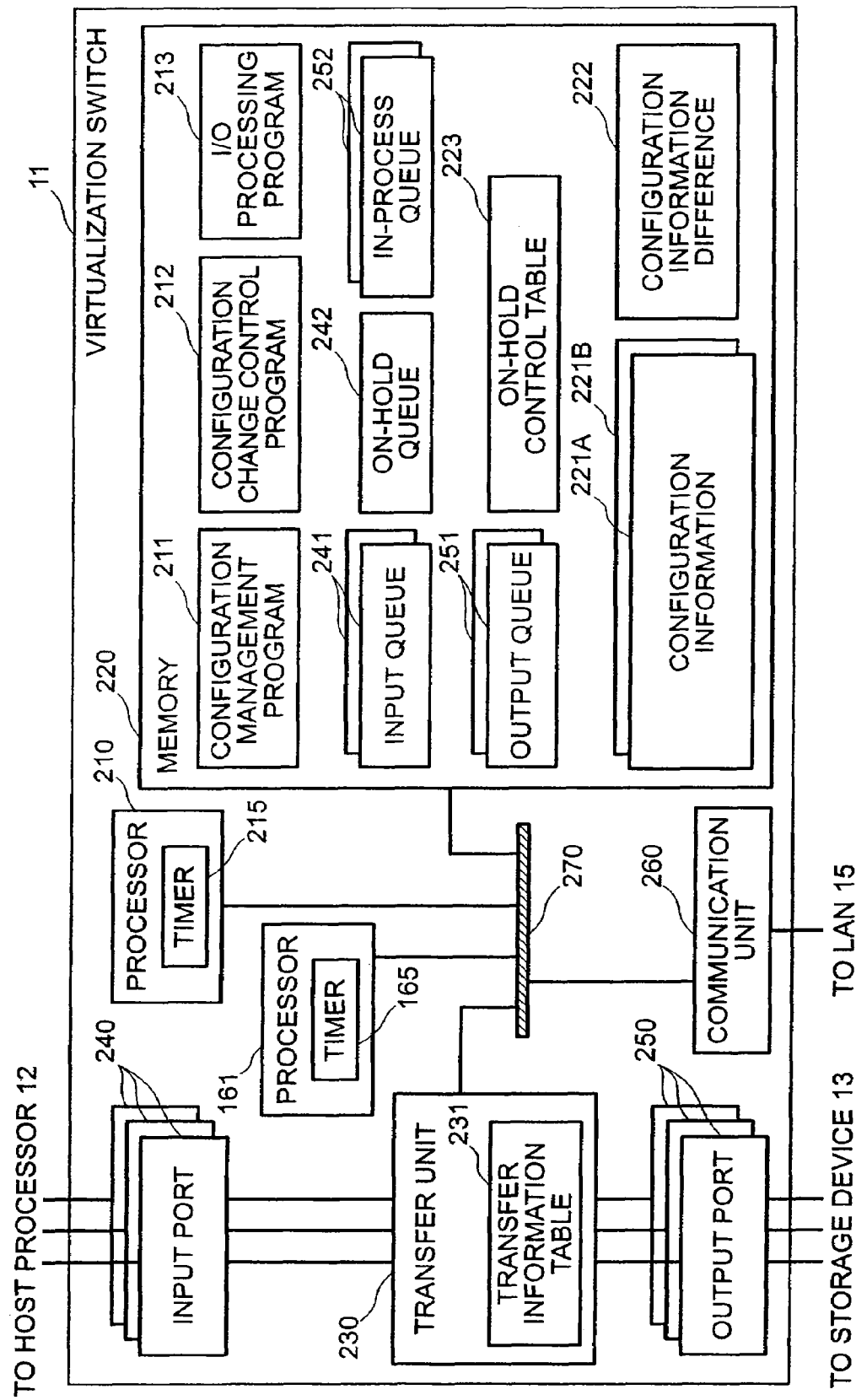
FIG. 12 is a drawing showing the internal processing of the virtualization switch 11 according to a third embodiment.

FIG. 12 shows the internal configuration of the virtualization switch 11 in a storage system.

As compared with the virtualization switch 11 shown in FIG. 9, FIG. 12 differs in that a temporary hold control table 223 is provided, the plural in-process queues 252 are provided, and double-buffered configuration information 221a, 221b is provided. The processor is provided with the timer 215.

The temporary hold control table 223 controls whether the input-output is held temporarily by storing the result of associating each entry of the configuration information 221 with the in-process queue 252. The reason why the plural queues to be processed 252 are provided is to limit a completion wait and input-output held temporarily by dividing the in-process queues 252 according to an input-output destination address. The configuration information 221 has double-buffereds to shorten the processing time in the I/O temporary hold state by switching the face of the configuration information 221. Further, the timer 215 is installed to set the processing of the I/O processing program 213 by the processor 210 and detect a timeout of the I/O temporary hold state.

Figure 13:
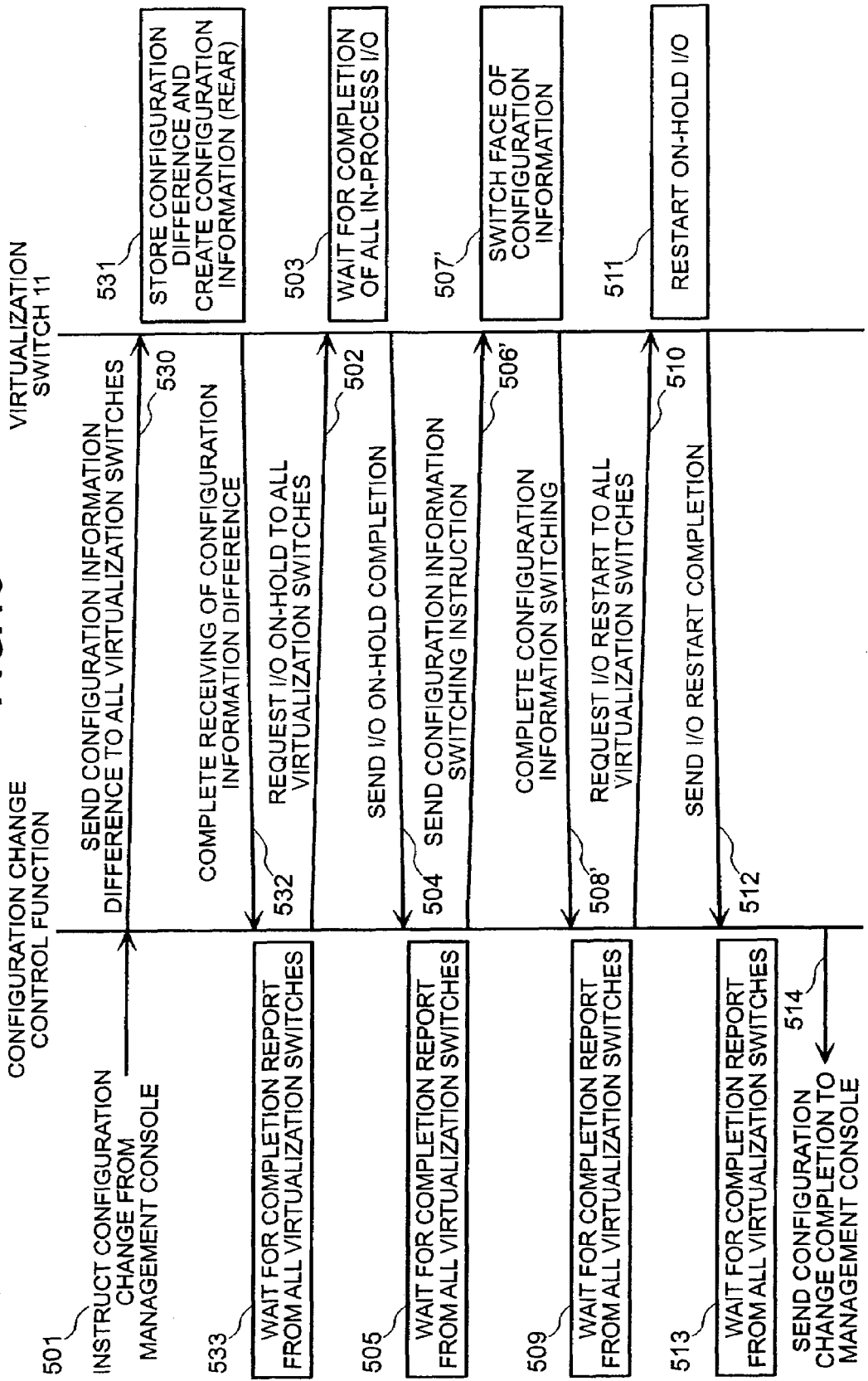
FIG. 13 is a drawing showing the communication protocol between the configuration change controller 16 and the virtualization switch 11 in the third embodiment.

FIG. 13 shows the communication protocol between the configuration change controller 16 and the virtualization switch 11 in the third embodiment.

In this embodiment, because only one virtualization switch enables a configuration change control function in the plural virtualization switches 11, the communication becomes necessary between the virtualization switch 11 in which the configuration change control function is effective and the virtualization switch 11 the function of which is not effective. The communication protocol is the example shown in FIG. 13. The same communication is performed even in the same virtualization switch 11. Accordingly, you are requested to assume that the "Configuration Change Control Function" shown in FIG. 13 indicates the processor 161 of FIG. 12 or the configuration change control program 212 that is executed there and the "Virtualization Switch 11" indicates the processor 210 in the local and remote virtualization switches 11 or the configuration management program 211 that is executed there and to refer to both.

FIG. 13 differs from the communication protocol shown in FIG. 5 in that steps 531 to 533 are added between the steps 501 and 502. Further, a configuration information switching request is sent instead of sending a configuration information change request in the steps 506 to 508 of FIG. 5.

In step 530, the processor 161 sends the configuration information difference 222 to all the virtualization switches 11 (530). All the virtualization switches 11 store the configuration information difference and create the configuration information 221 (531). The virtualization switch 11 creates the face (221b here) that is not used by the I/O processing program 213 of the configuration information 221. Subsequently, the virtualization switch 11 returns a configuration information difference receiving completion report to the configuration controller 16 (532, 533).

Further, in step 507', the virtualization switch 11 switches the configuration information 221a to the configuration information 221b. The processing time can be reduced because the processing during an I/O temporary hold state (between the steps 503 and 511) is completed only by switching the face of the configuration information 221 in the step 507' in this way.

Figure 14:
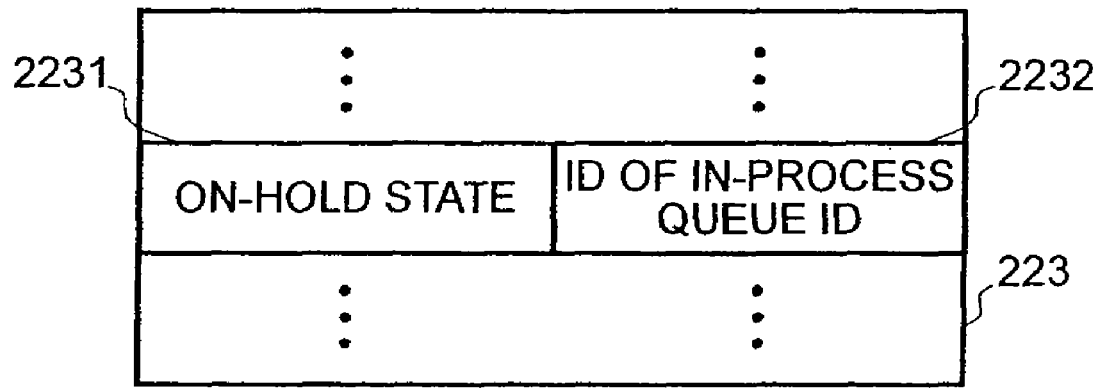
FIG. 14 is a drawing showing an example of a temporary hold control table 223 in FIG. 12.

FIG. 14 shows an example of the temporary hold control table 223 in FIG. 12.

The temporary hold control table 223 has a plurality of entries. Each entry has a temporary hold state 2231 and a in-process queue ID 2232. The temporary hold state 2231 and the in-process queue ID 2232 are both provided to limit a completion wait and input-output held temporarily. As the initial values of the temporary hold state 2231 and the in-process queue ID 2232, the processor 210 stores the ID of the in-process queue 252 that is not in a temporary hold state and empty (not associated with the temporary hold control table 223) respectively when the virtualization switch 11 is initialized or when the virtual volume 100 is created. When the empty in-process queue 252 is provided, the processor 210 creates the in-process queue 252 anew and stores the ID as the ID 2232.

Figure 15:
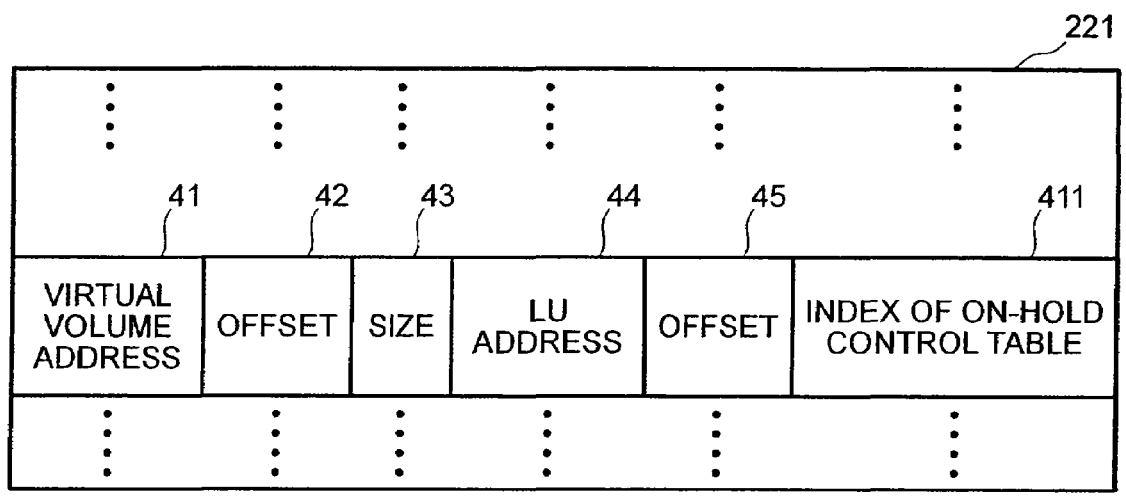
FIG. 15 is a drawing showing the table of the configuration information 221 in FIG. 12.

FIG. 15 shows the configuration information 221 in FIG. 12.

FIG. 15 differs from the table with the table shown in FIG. 4 in that an index 411 of the control table 223 is provided. The index 411 specifies the entry of the temporary hold control table 223. The entry of the configuration information 221, that is, the address range on the virtual volume 100 is associated with the temporary hold state 2231 and the in-process queue 252 through the entry of the temporary hold control table 223. Accordingly, whether input-output is held temporarily per address range can be controlled.

Figure 16:
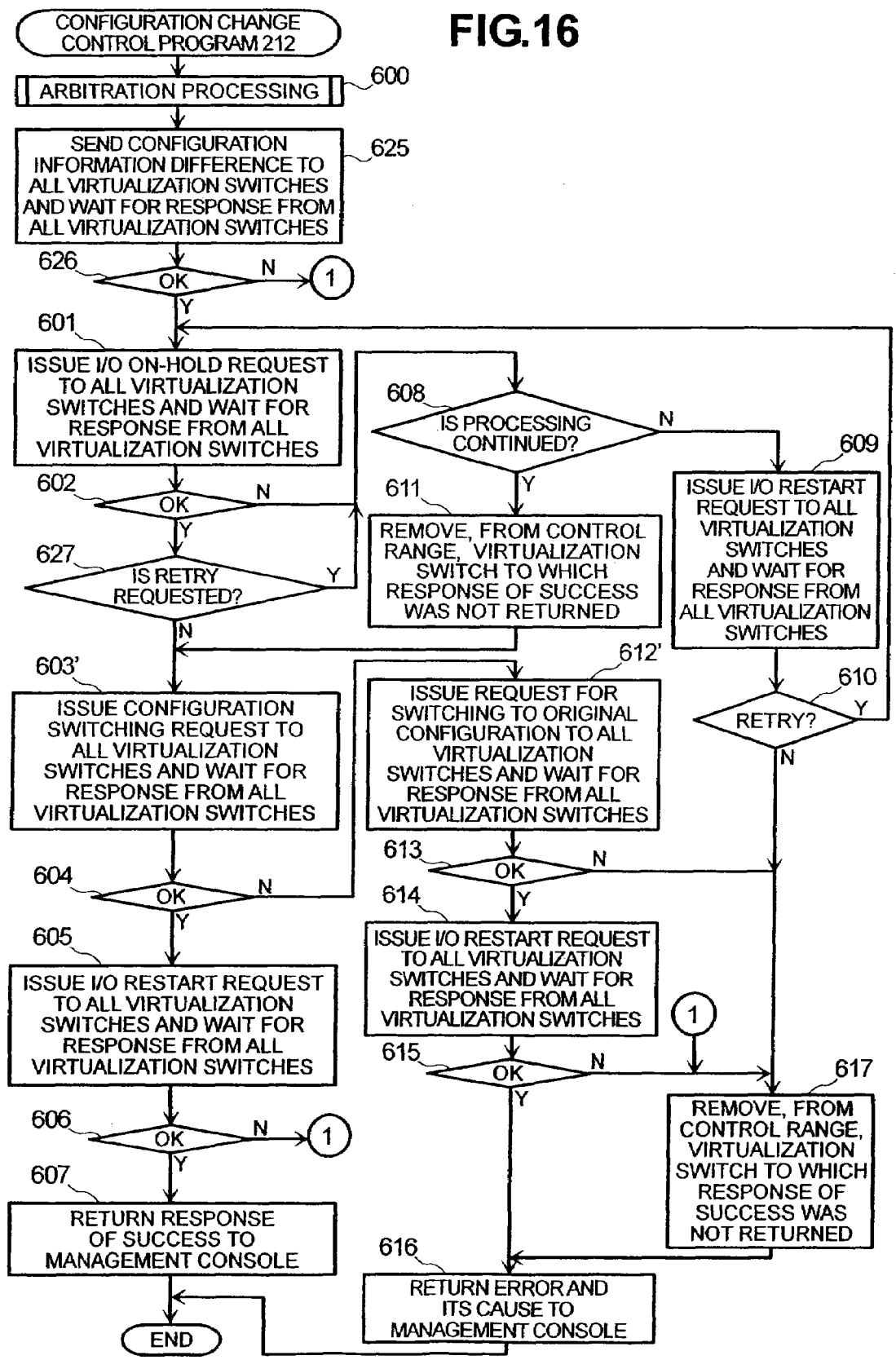
FIG. 16 is a flowchart showing the processing of the configuration management program 212 in FIG. 12.

FIG. 16 shows the processing of the configuration change control program 212 in the virtualization switches 11 shown in FIG. 12.

FIG. 16 differs from FIG. 10 in that steps 625 and 626 are inserted next to the arbitration processing (step 600) and step 627 is inserted next to the step 602. Further, steps 603' and 612' are included instead of the steps 603 and 612.

The processing of the steps 625 and 626 is the same as the procedures 530, 533 of FIG. 13. In the step 627, the processor 161 issues an I/O temporary restart request once (609) and retries the processing of the step 601 and later steps when the processor 210 detects a timeout of the I/O temporary hold state during processing of the I/O processing program 213 (627 "Y").

In this step 627, an I/O temporary hold state can be set prior to an input-output timeout by the host processor 12. Further, in the steps 603' and 612', the processing of switching the configuration information from 221a to 221b is requested from the virtualization switch 11 instead of rewiring the configuration information 221. Because the switching processing of the configuration 221 is completed in a shorter time than rewriting the configuration information to a memory, the time of the I/O temporary hold state can be reduced as a result.

Figure 17:
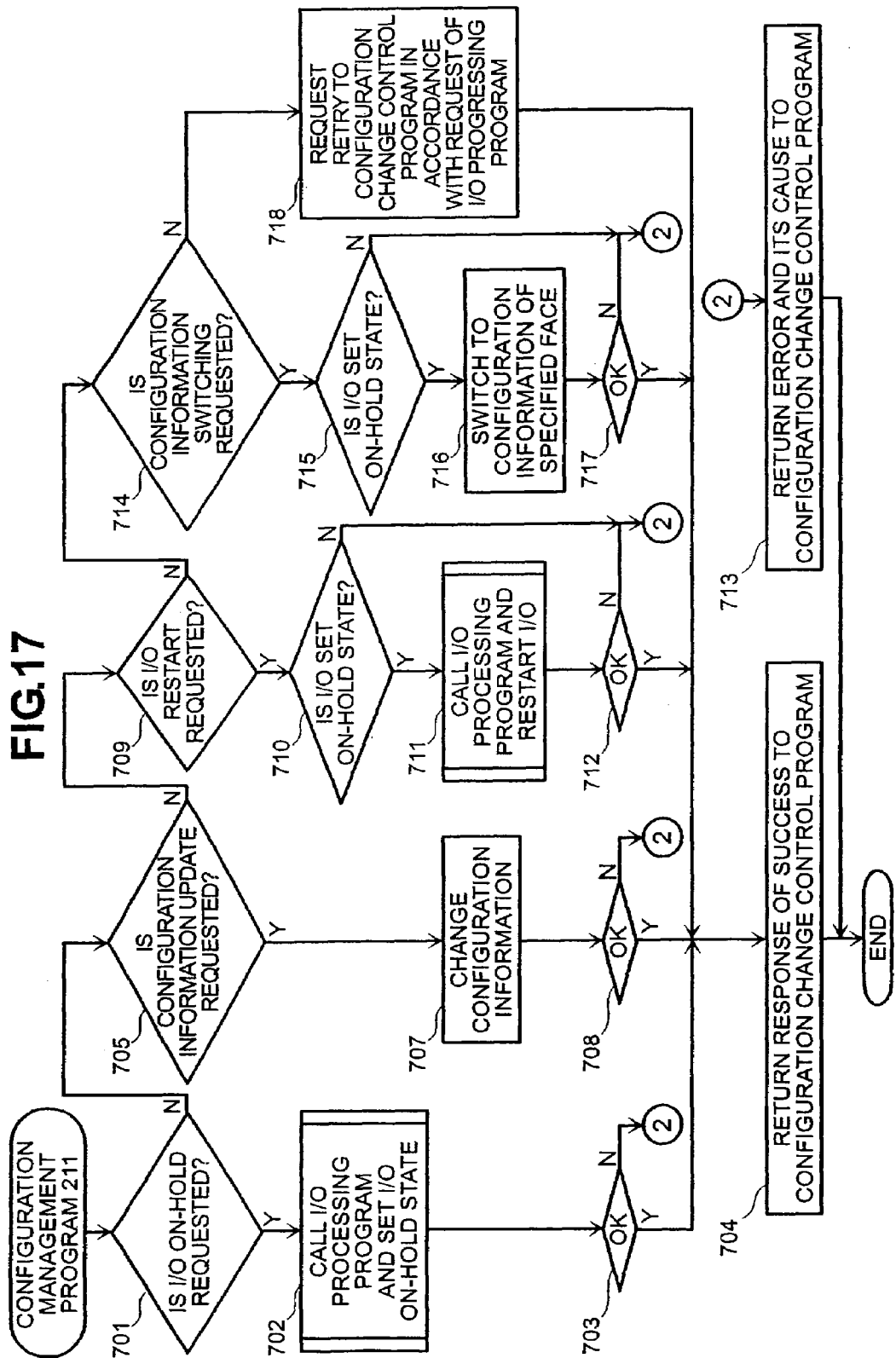
FIG. 17 is a flowchart showing the processing of the configuration management program 211 in FIG. 12.

FIG. 17 shows the processing of the configuration program 211 in the virtualization switch 11 of FIG. 12.

Figure 7:
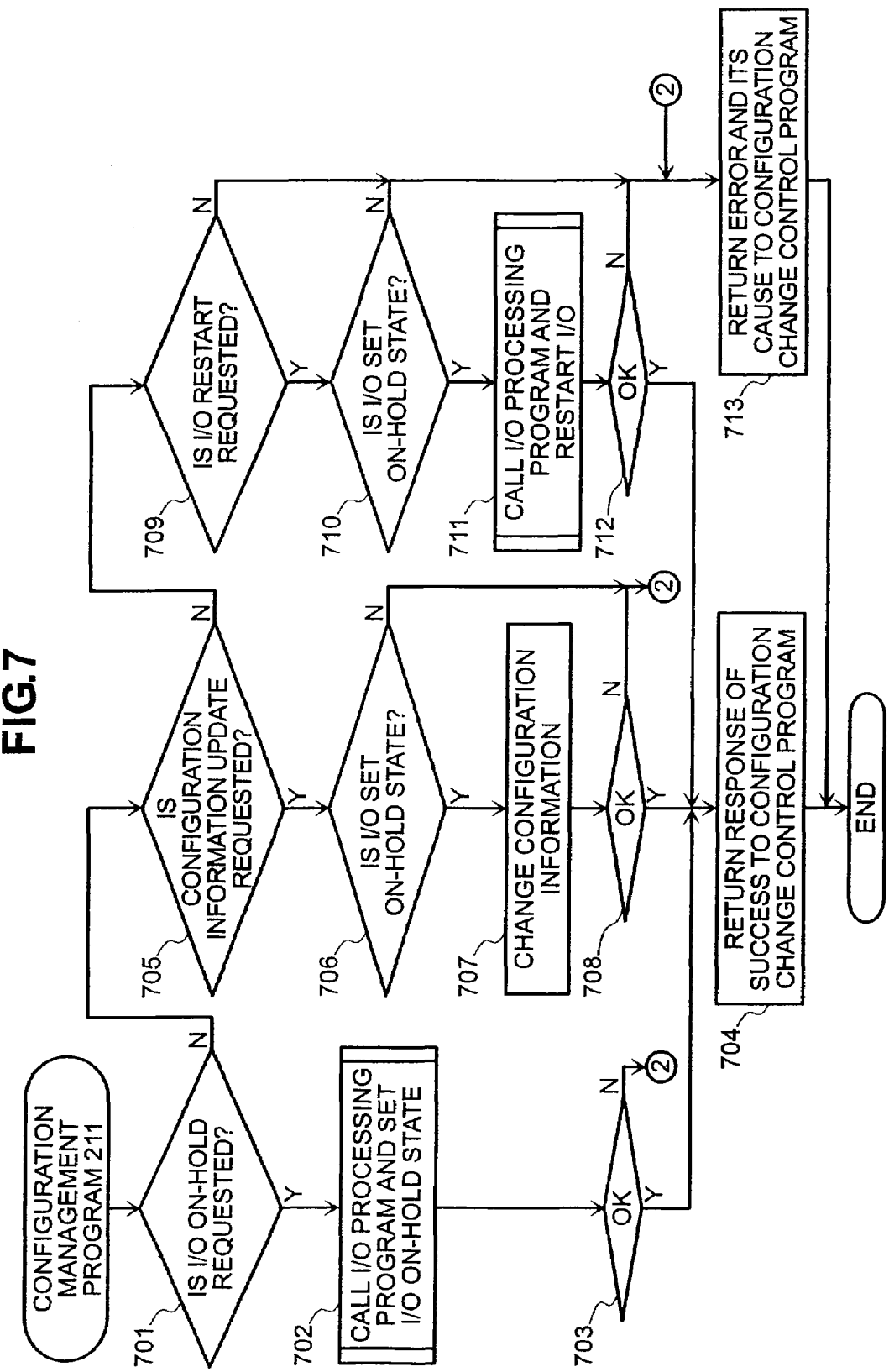
FIG. 7 is a flowchart showing the processing of a configuration management program 211 in a virtualization switch 11.

FIG. 17 differs from the flowchart shown in FIG. 7 in that steps 714 to 718 were added next to the step 709 "N". In the step 707, among the configuration information 221, the face (221b) which the I/O processing program 213 does not use is updated. The processing of steps 714 "Y" to 704 is the same as the steps 507', 508' of FIG. 13.

The configuration management program 211 is called when a request from the I/O processing program 213 is issued in addition to an I/O temporary hold request, an I/O restart request, a configuration information update request, and a configuration information switching request. When this request is provided, processing goes to the step 601 "N". Subsequently, the processor 210 transfers the request of the I/O processing program 213 to the configuration change controller 16 (718). This processing can retry the processing in the configuration change control program 212 on a timeout of an I/O temporarily stopped state.

Further, the processing of the steps 705 to 704 is the same as the procedures 531, 532 of FIG. 13.

Figure 18:
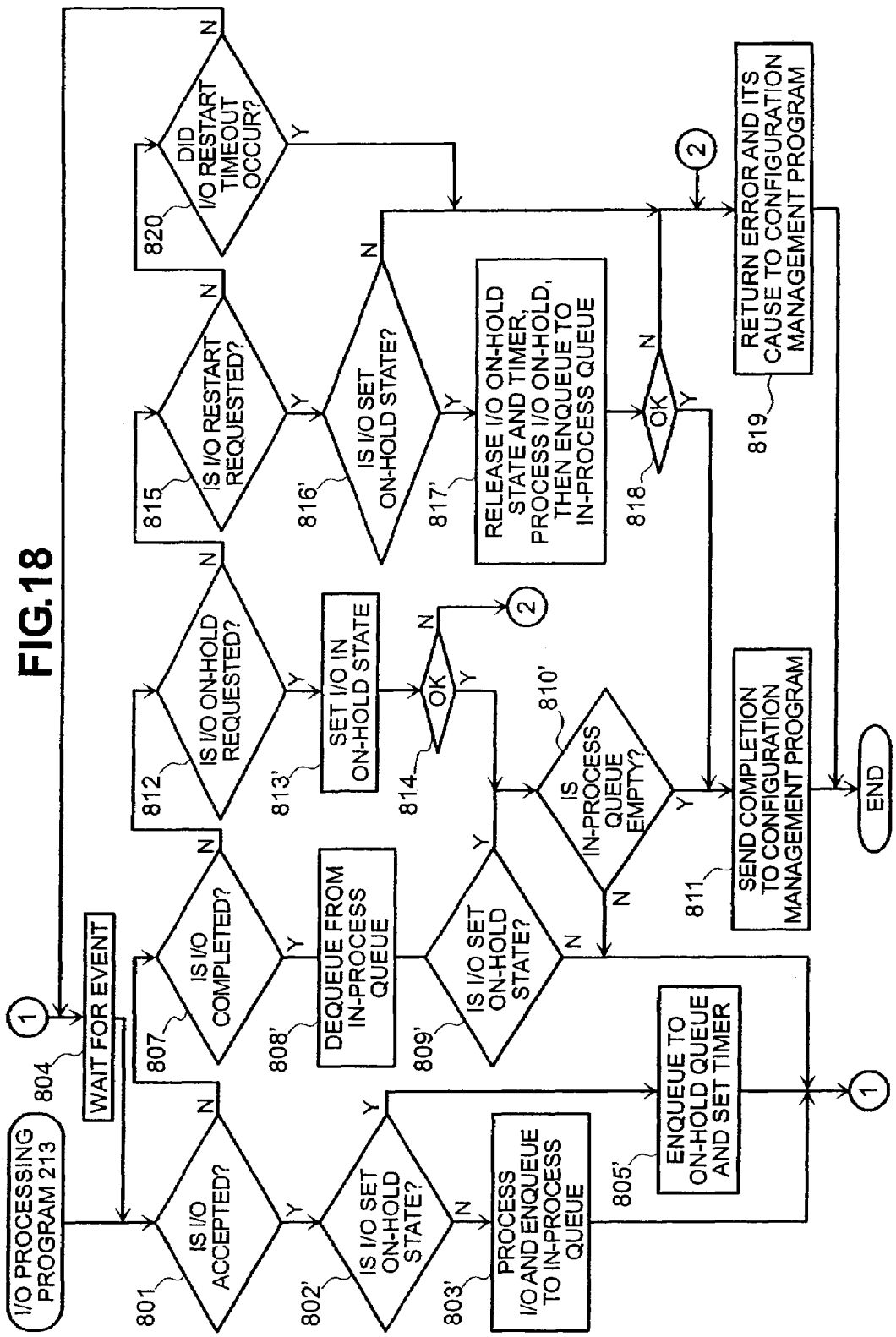
FIG. 18 is a flowchart showing the processing of the I/O processing program 213 in FIG. 12.

FIG. 18 shows the processing of the I/O processing program 213 in FIG. 12.

Figure 8:
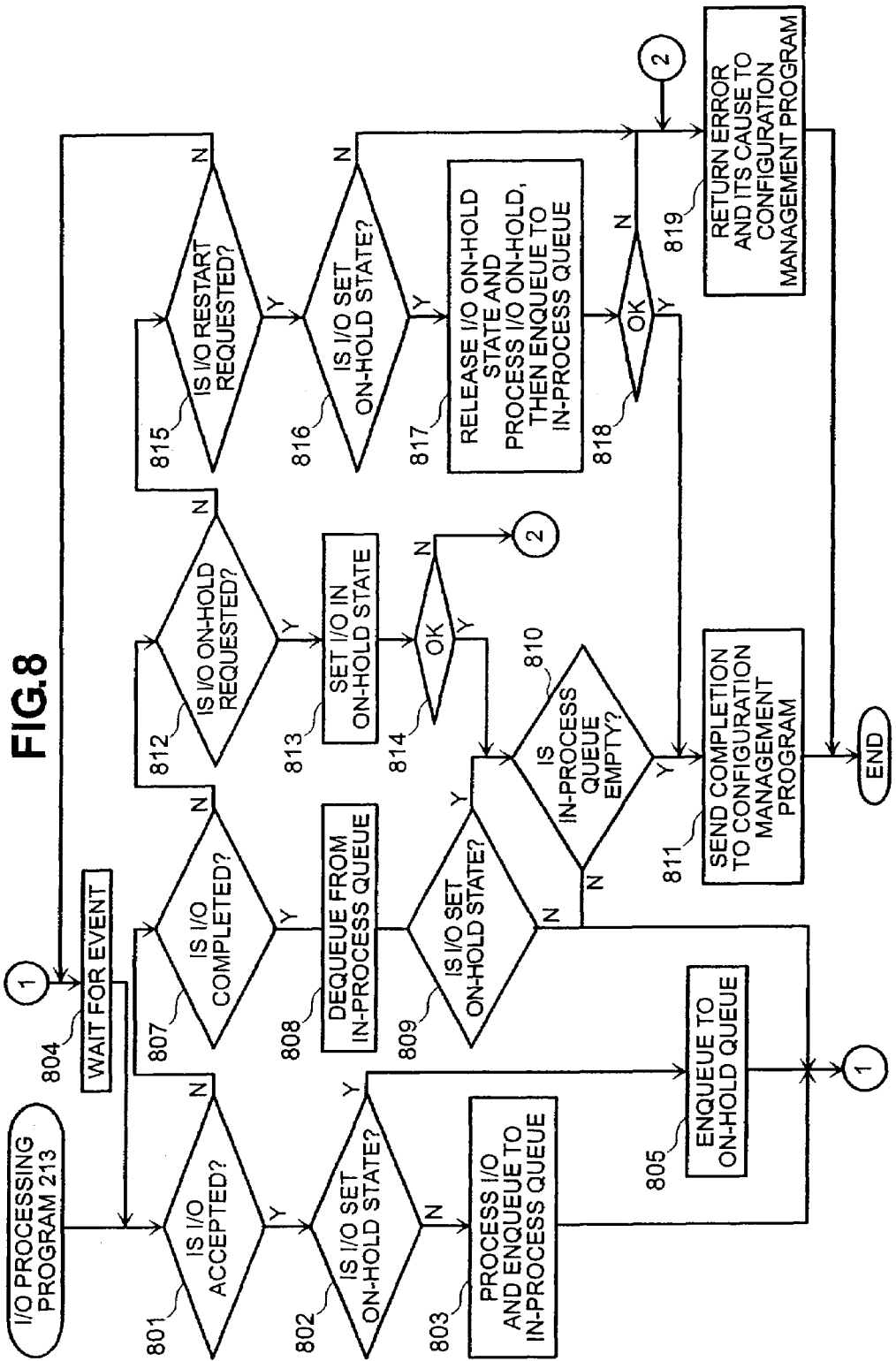
FIG. 8 is a flowchart showing processing of an I/O processing program 213 in the virtualization switch 11.

FIG. 18 differs from the flowchart of FIG. 8 in the processing contents of the steps 802, 803, 805, 808, 809, 810, 813, 816, 817.

In steps 802', 809', 816', the processor 210 determines that the I/O is set in a temporary hold state by checking the temporary hold state 2231 of the entry the index 411 in the configuration information 221 specifies. This can control whether the input-output is held temporarily or not per address range of the virtual volume 100 that is an input-output destination.

Further, in steps 803' and 808', the processor 210 uses the in-process queue 252 specified with the ID 2232 of the in-process queue of the entry which the index 411 in the configuration information 221 specifies as the in-process queue 252.

Further, in step 813', the processor 210 changes a state so that only the input-output for an area on the virtual volume 100 defined according to the contents of the configuration information difference 222 can be set in the temporary hold state. Specifically, the processor 210 lists up the index 411 of the configuration information 221a that corresponds to all entries registered in the configuration information difference 222 and changes all the temporary hold states 2231 of the entry that corresponds to these indexes 411 during a temporary hold. As described already, in the step 802', this temporary hold state 2231 is checked. Accordingly, the output-output request that corresponds to this temporary hold state 2231, that is, only the input-output request affected by the configuration information difference 222 is held.

In step 810', the processor 210 lists up the index 411 of the configuration information 221a that corresponds to all entries registered in the configuration information difference 222 and checks all the in-process queues 252 specified by the in-process queue ID 2232 of the entry that corresponds to these indexes 411, then determines whether the in-process queue 252 becomes empty or not.

In step 805', the processor 210 enqueues to the in-process queue 252 shown in the in-process queue ID 2232 and sets the timer 215. In step 817', the processor 210 resets the timer 215, resets the temporary hold state 2231 held in step 813', processes the input-output enqueued to the on-hold queue 242, and enqueues to the queue be processed 252 shown in the in-process queue ID 2232.

In the step 820 "Y", the processor 210 starts the processing of the I/O processing program 213 on the timeout of the timer 215. In this case, the processor 210 executes the processing of the step 819 and returns an error to a configuration management program. The processor 210 executes the processing of the step 818.

Because other aspects are the same as the second embodiment, the description is omitted.

In the third embodiment, the time of the I/O temporary hold state can be reduced in the steps 625 and 603' in this manner. The time of the I/O temporary hold state can be limited by releasing the I/O temporary hold state and retrying the processing in the steps 805', 820, 627. This can prevent the input-output timeout or performance deterioration in the host processor 12.

Further, in this embodiment, it is possible to limit input-output temporarily held in steps 813' and 802' to a range affected by the configuration change. Accordingly, it is possible to prevent deterioration of performance by the configuration change.

As a modification example of this embodiment, there is also a method for being not provided with the aforementioned double-buffered configuration information 221 and not executing the processing of the step 625. For example, the processing of the step 603 (rewriting of the configuration information 221 in the first embodiment) may also be performed instead of step 603' in which the configuration information 221 is switched. In that case, although the time of the I/O temporary hold state is prolonged, the capacity of the memory 220 can be suppressed.

Next, a fourth embodiment is described with reference to FIGS. 19 to 26.

Figure 19:
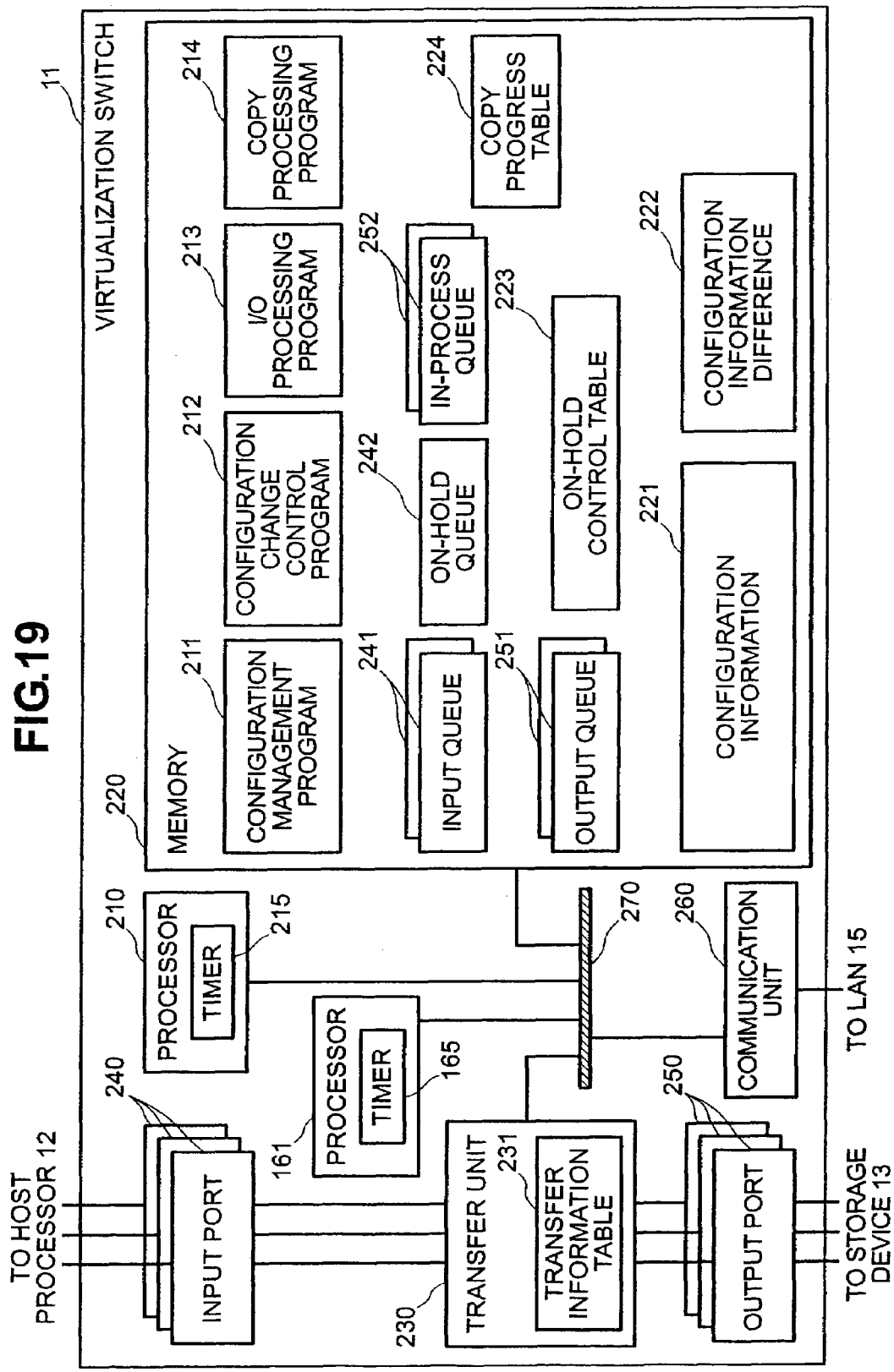
FIG. 19 is a drawing showing the internal processing of the virtualization switch 11 in a fourth embodiment.

FIG. 19 shows the internal configuration of the virtualization switch 11 in the fourth embodiment.

FIG. 19 differs from the configuration shown in FIG. 12 in that a copy processing program 214 and a copy progress table 224 are added and the one-face configuration information 221 is provided.

When the copy processing program 214 is executed by the processor 210 and changes the LU 1311 to which the virtual volume 100 corresponds to the other LU 1312, the program copies data from the LU 1311 to the LU 1312. The copy progress table 224 is used to manage advancement of the copy processing in the copy processing program 214 and has a plurality of entries. Each entry corresponds to the real area 132 that constructs the LU 131. In this embodiment, the configuration information difference 222 is generated during I/O temporary stop. Accordingly, the configuration information 221 has only one face. Other aspects are the same as FIG. 12.

Figure 20:
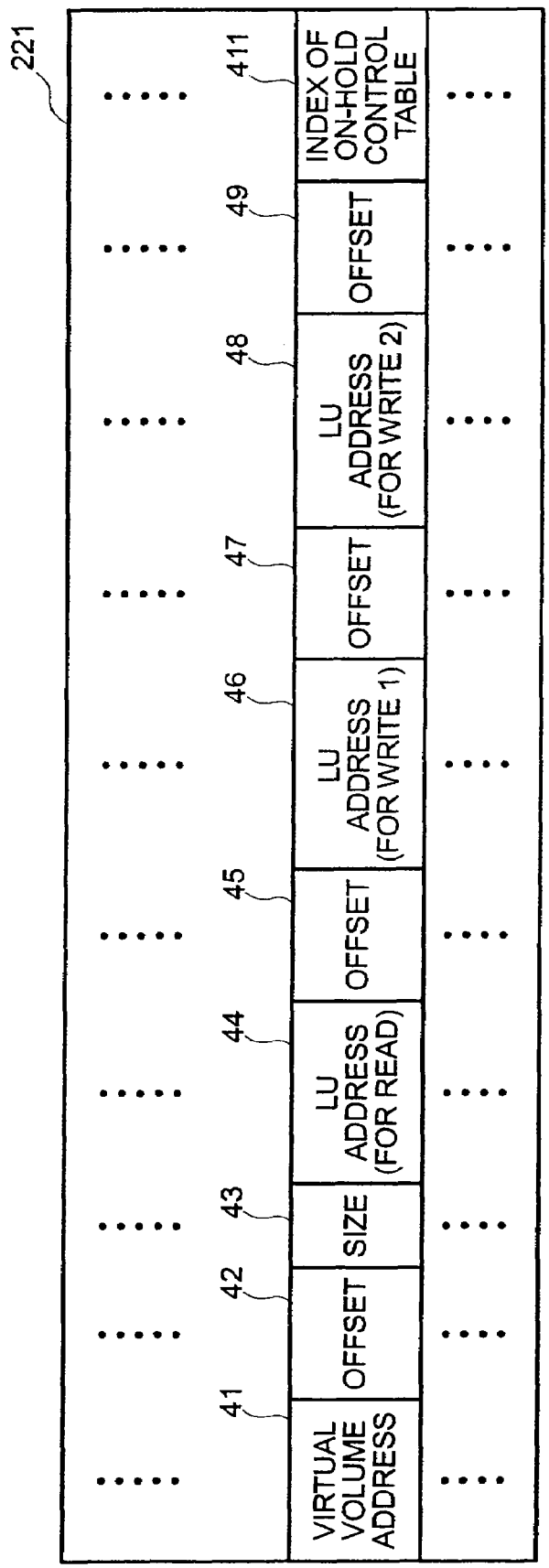
FIG. 20 is a drawing showing the table of the configuration information 221 in FIG. 19.

FIG. 20 shows an example of the configuration information 221 in the virtualization switch 11 of FIG. 19.

As compared with FIG. 15, in FIG. 20, a total of three pairs of the LU address and offset consisting of one pair of 44 and 45 for the Read command and two pairs of 46 and 47, and 48 and 49 for the Write command are provided. In this embodiment, the correspondence of the virtual volume 100 differs in the Write and Read commands due to the progress of the copy processing program 214. Further, in the case of Write operation, because dual writing is also performed to the LU 1311 and the LU 1312, two pairs of the address and offset for the Write command are prepared.

Figure 21:
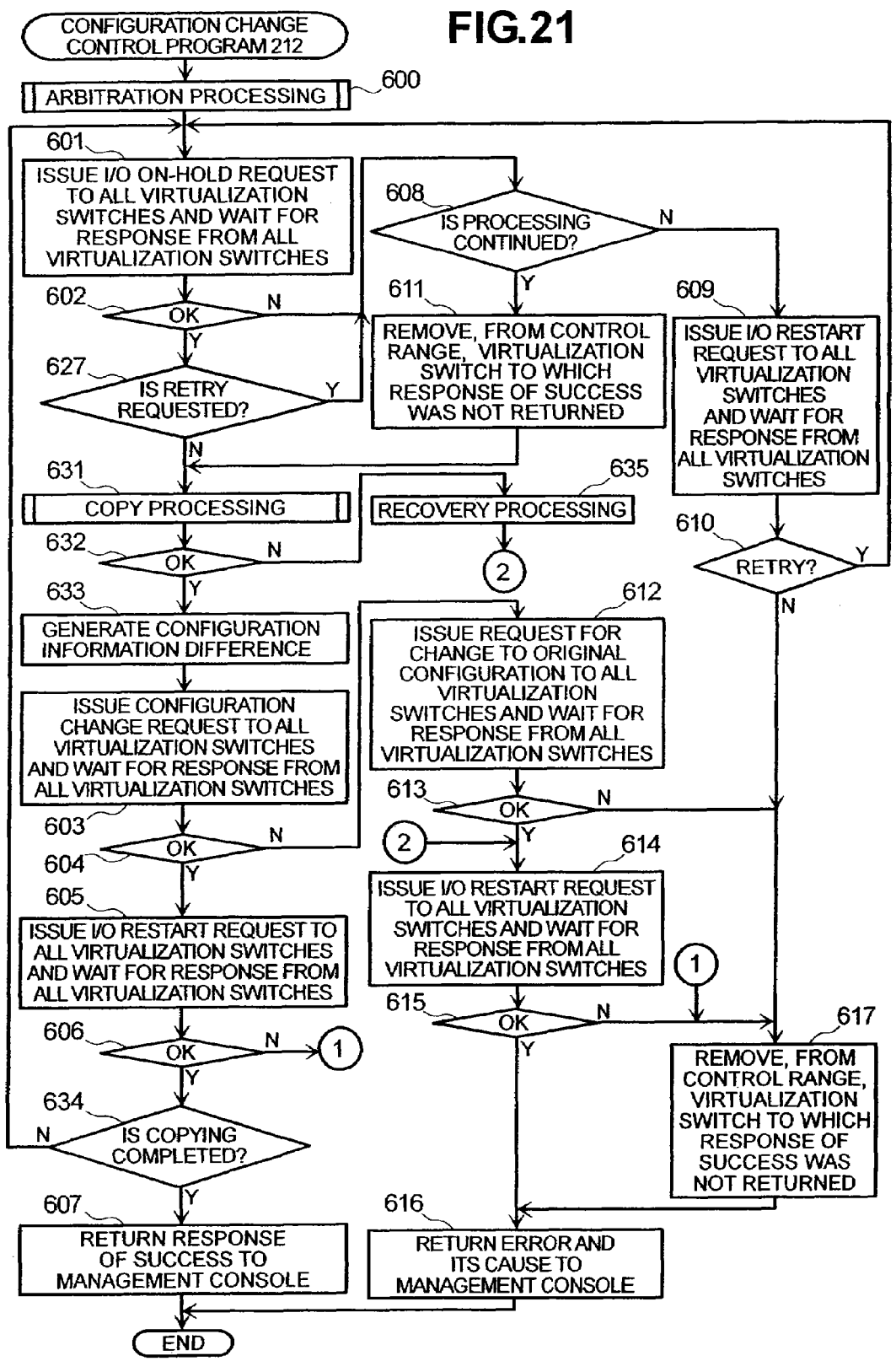
FIG. 21 is a flowchart showing the processing of the configuration change control program 212 in FIG. 19.

FIG. 21 shows the processing of the configuration change control program 212 in the virtualization switch 11 of FIG. 19.

As compared with the flowchart of FIG. 16, in FIG. 21, steps 631 to 633 and 635 are added between the steps 627 and 603 and step 634 is added between the steps 606 and 607. Further, the processing of the steps 603, 612 is performed instead of the steps 603', 612'.

In the copy processing 631, the processor 161 starts the copy processing program 214. When copying is performed without any error (632 "Y"), the processor 210 refers to the copy progress table 224 and creates the configuration information difference 222. The details of difference creation will be described later with reference to FIG. 26.

In the step 634, the processor 161 determines whether the copying from the LU 1311 to the LU 1212 was all completed by checking the copy progress table 224. When the copying is completed (634 "Y"), the processor 161 executes the processing of the step 607 and completes the processing. On the other hand, when the copying is not completed (634 "N"), the processor 161 repeats the processing from the step 601.

When the copying ended abnormally (632 "N"), the processor 161 performs recovery processing (635). Specifically, the processor 161 creates the difference 222 so that the configuration information 221 before executing the configuration change control program 212 can be returned and issues a configuration change request to all the virtualization switches 11, then waits for the completion. Further, the processor 161 executes the processing of the step 614 and later steps and reports an error to a management console, then completes the processing.

Figure 22:
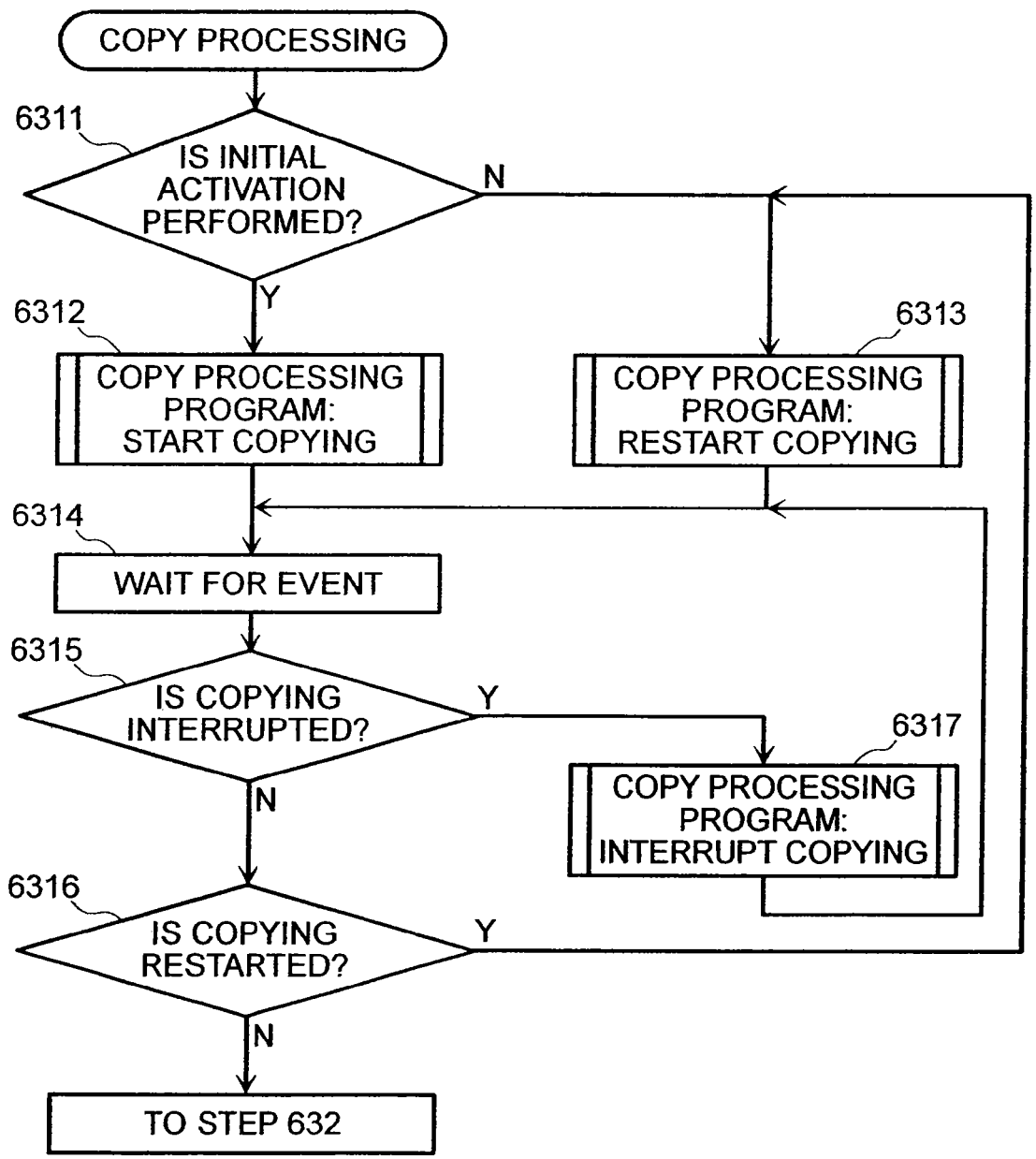
FIG. 22 is a flowchart showing the details of copy processing 631 in the flowchart of FIG. 21.

FIG. 22 shows the detailed processing operation of the copy processing 631 shown in the flowchart of FIG. 21.

First, the processor 161 sends a copy start request to the processor 210 and activates the copy processing program 214 (6312) after activating the configuration change control program 212 and then activating first copy processing 6311 (6311 "Y"). with the copy start request, the processor 161 instructs the address range in which copying is performed by the activation of the copy processing program 214 to the processor 210.

On the other hand, when no initial activation is performed (6311 "N"), the processor sends the copy restart request to the processor 210 and activates the copy processing program 214 (6313). Also in this case, the processor instructs the address range in which the copying is performed by the activation of this copy processing program 214 to the processor 210. In both cases, the processor 161 subsequently enters an event wait state (6314). The events for which the processor 161 waits are the completion of the copy processing program 214 and the receiving of a copy priority request or a copy interrupt request in step 718 to be described later. When the processing of the copy processing program 214 was completed (6315 "N", 6316 "N"), the processor 161 shifts to step 632.

For the copy interrupt request (6315 "Y"), the processor sends the copy interrupt request to the processor 210 and activates the copy processing program 214 (6317). For the copy priority request, the processor interrupts the copying once and performs the processing from the step 6315. Subsequently, because the copy processing must be reactivated, the processor 161 executes the step 6316 "Y" and repeats the processing of the step 6313 and later steps. At that time, because the processor transfers an address to be copied preferentially from the processor 210, it specifies the range that includes the address in the step 6313.

As described in the steps 6312 and 6313, the copy processing program 214 is activated plural times. Further, in the step 6317, the copying is interrupted once. Consequently, the time the input-output is held temporarily can be reduced.

Figure 23:
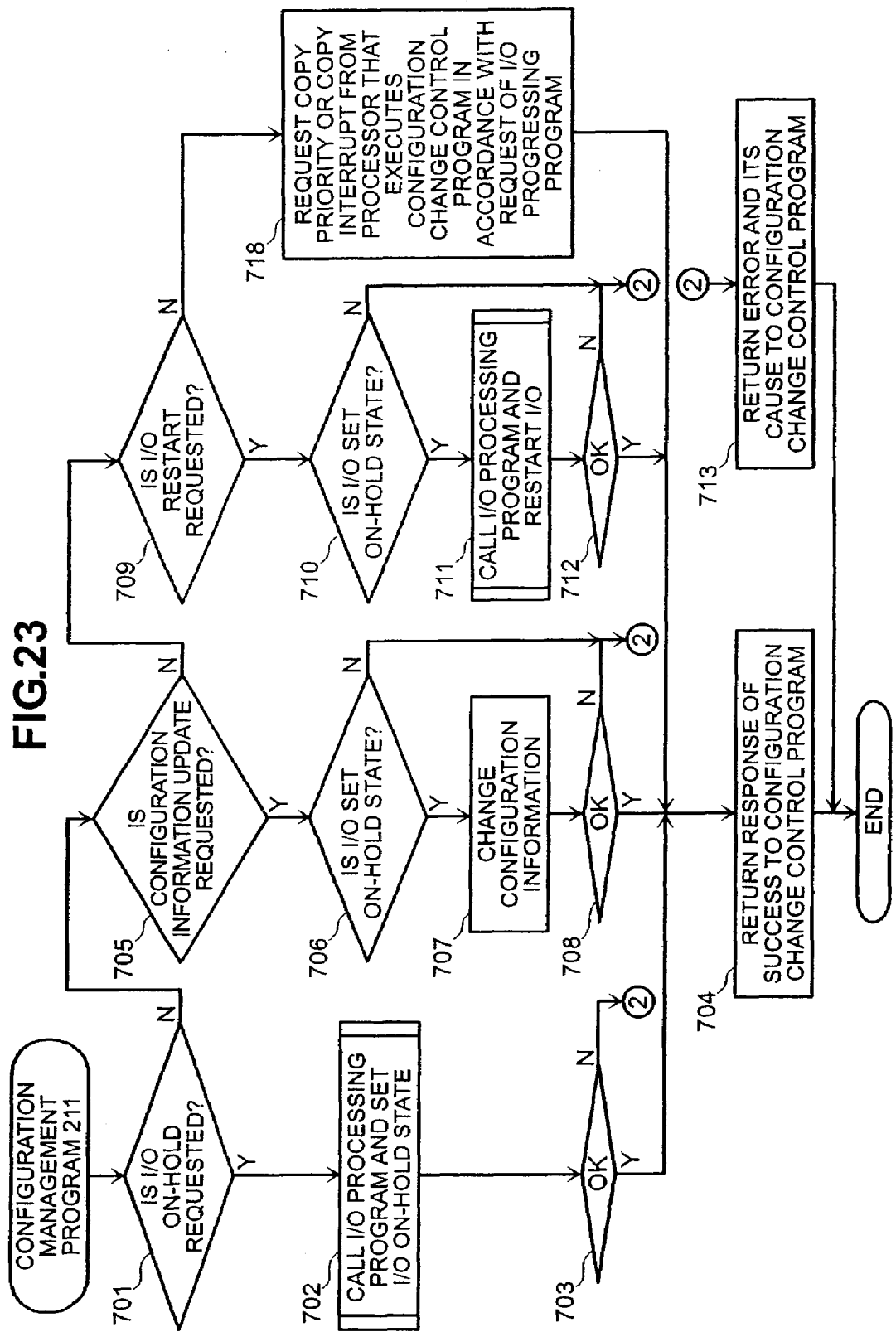
FIG. 23 is a flowchart showing the processing of the configuration management program 211 in FIG. 19.

FIG. 23 shows the processing of the configuration management program 211 in the virtualization switch 11 of FIG. 19.

In this embodiment, because the face of the configuration information 221 is not switched during I/O temporary hold state, the processing of the configuration management program 211 is similar to that shown in the first embodiment. Accordingly, when FIG. 23 is compared with the flowchart of FIG. 7, FIG. 23 differs from FIG. 7 in that step 718 is added.

In this embodiment, the timing the configuration management program 211 is called is caused by a copy priority request or a copy interrupt request from the I/O processing program 213 in addition to the case of FIG. 7. In either case, the processor 210 determines as No in step 709 and issues the copy priority request or copy interrupt request to the processor 161 (718). For the copy priority request, however, because the processor 210 transfers an address to be copied preferentially from the I/O processing program 213, it also transfers the address to the processor 161.

Thus, the configuration management program 211 reflects a request caused by the processing of the I/O processing program 213 in the processing of the configuration change control program 212 by the processing of the step 718.

Figure 24:
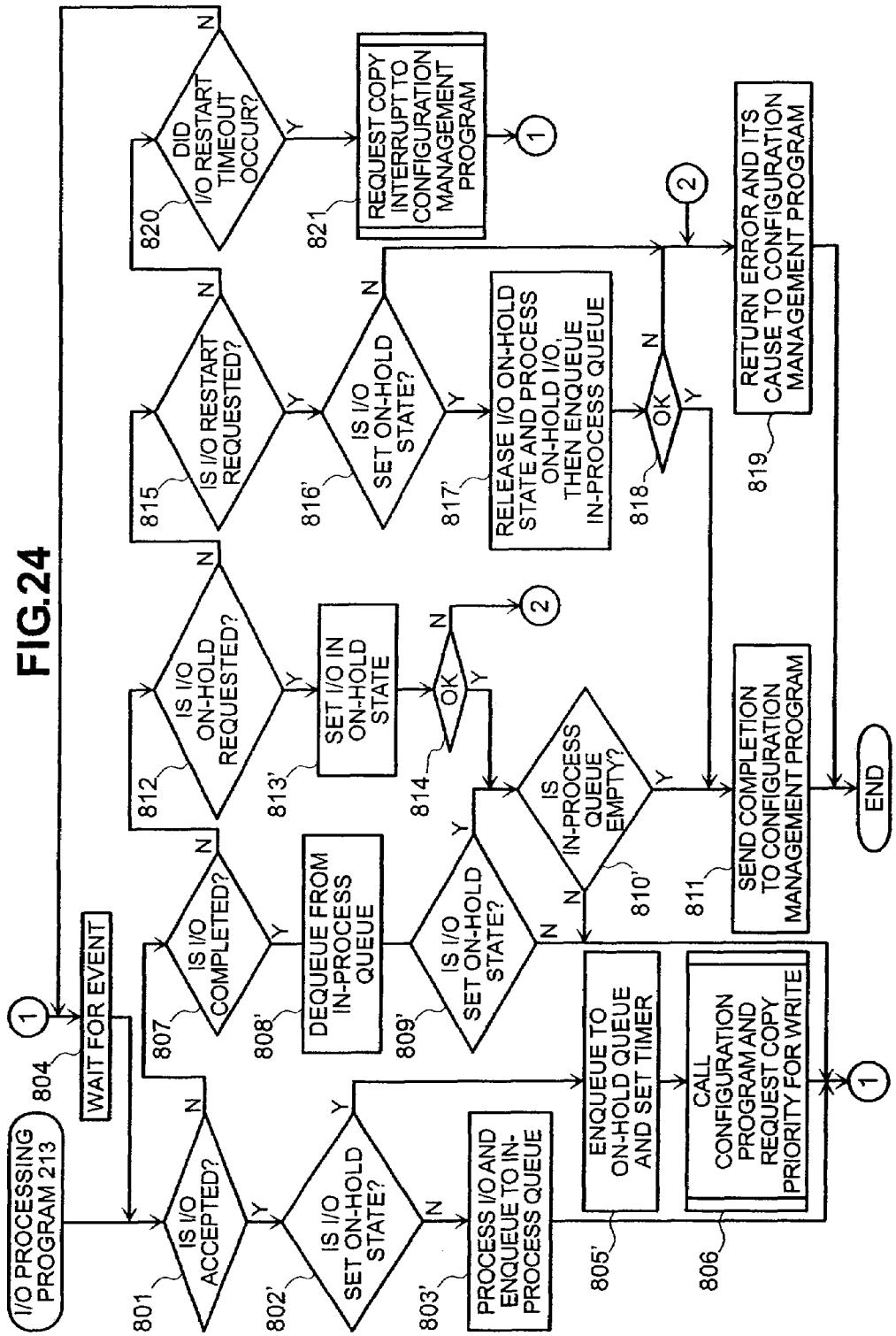
FIG. 24 is a flowchart showing the processing of the I/O processing program 213 in FIG. 19.

FIG. 24 shows the processing of the I/O processing program 213 in the virtualization switch 11 of FIG. 19.

In comparison with the flowchart shown in FIG. 18, in FIG. 24, step 806 is added next to the step 805' and step 821 is added next to the step 820.

In the step 806, the processor 210 calls the configuration management program 211 and requests copy priority when the accepted input-output is Write operation. In that case, the processor transfers the address range written by the accepted input-output to the configuration management program 211.

In this embodiment, because the timeout (820 "Y") of the timer 215 is caused by the copy processing, in the step 821, the processor 210 calls the configuration management program 211 and requests a copy interrupt.

When the copy processing by the input-output held temporarily is interrupted or made to take preference by the processing of the steps 806 and 821, the time the input-output is held temporarily can be reduced.

In step 806, by making a copy interrupt request when the accepted input-output is read, the time the input-output is held temporarily can be further reduced (In this case, the step 821 becomes unnecessary). The copy processing, however, is as delayed as this operation.

Figure 25:
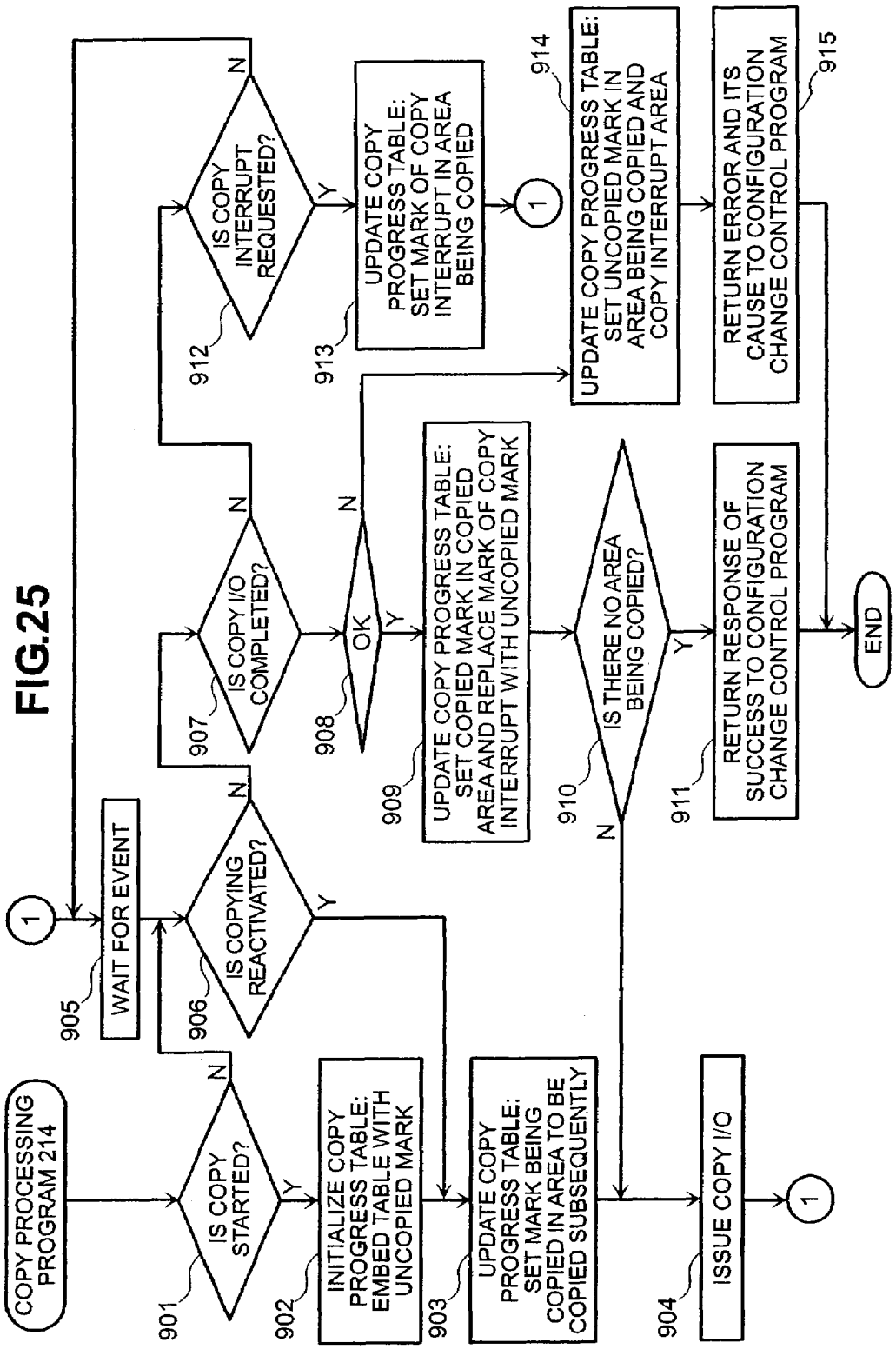
FIG. 25 is a flowchart showing the processing of a copy processing program 214 in FIG. 19.

FIG. 25 shows the processing of the copy processing program 214 in the virtualization 11 of FIG. 19.

The copy processing program 214 is activated at the timing of the completion of a copy start request, a copy restart request, and a copy interrupt request from the configuration change control program 212, and the input-output that copies data actually. When the copy start request is provided (901 "Y"), the processor 210 initializes all the entries of the copy progress table 224 to a value ("0" in this example) that indicates Uncopied (902). Subsequently, the entry of the copy progress table that corresponds to the address range transferred from the configuration change control program 212 is set to a value ("1" in this example) that indicates Being Copied (903).

Further, the processor 210 issues an input-output instruction (hereafter referred to as COPY I/O) that performs copying to the area set to "1" (Being Copied) in the copy progress table 224 (904). Specifically, the input-output request that performs copying is generated and enqueued to the output queue 251. Further, the processor 210 waits for an event (905). Among the activation timings of the copy processing program 214, the processor waits for a request other than the copy start request and executes the processing of step 906 and later steps. Further, when the copy restart request was provided (906 "Y"), the processor 210 repeats the processing of the step 903 and later steps.

When COPY I/O is completed (907 "Y"), the processor 210 confirms that the result of this input-output ends normally (908 "Y") and updates the copy progress table 224 (909). Specifically, the processor sets a value ("4" in this example)

that indicates Copied in an entry where COPY I/O was completed and sets a value that indicates a copy interrupt (in this example, "0" (Uncopied) in the entry in which "2" is stored). Further, when there is no entry in which "1" (Being Copied) in the entry of the copy progress table 224, the processor 210 returns a response of success to the configuration change control program 212 and completes the processing (911). When there is an entry being copied (910 "N"), the processor 210 repeats the processing from the step 904.

When the copy interrupt request is received (912 "Y"), the processor 210 sets "2" (Copy Interrupted) in all entries where "1" of the copy progress table 224 is set and repeats the processing from the step 905.

When COPY I/O ended abnormally (908 "N"), the processor 210 sets "0" (Uncopied) in all entries where "1" (Being Copied) and "2" (Copy Interrupted) of the copy progress table 224 are set (914). Then an error and its cause are returned to the configuration change control program 212 and the processing terminates (915).

The copy processing program 214 can copy data by the processing of the COPY I/O of the step 904 in this manner.

The operation principle of data migration according to the fourth embodiment is described with reference to FIG. 26.

FIG. 26A shows the interrelationship between the virtual volume 100 and the real area 132, and the interrelationship with the copy progress table 224 in the copy processing 631.

The arrow from the real area 132 to the virtual volume 100 shows the interrelationship in a Read request to the virtual volume 100 and the arrow from the virtual volume 100 to the real area 132 shows the interrelationship in a Write request to the virtual volume 100. An arrow marked by a dotted line shows that the input-output to this arrow is held.

Arrows appear from an area 1001 on the virtual volume to a real area 13211 and a real area 13221. This indicates that the same data is written dually to the two real areas 13211, 13221 when the Write request is issued to 1001.

Further, the arrows from real areas 13212, 13213 to real areas 13222, 13223 indicate copying is performed in this direction. 2241a, 2242a, 2243a, 2244a of the copy progress table correspond to areas 1001, 1002, 1003, 1004 on the virtual volume.

FIG. 26A shows that 2241a is set to Copied "4" and the copying from the real area 13211 to real 13221 is completed regarding an area 100-1. Regarding the copied area, for Read, data is written from a shift destination, that is, 1311, and, for Write, data is written to both shift source and shift destination, that is, both 1311 and 1312. This is because the latest data is left in the LU 1311 even when the shift into the LU 1312 failed halfway.

Further, 2242a to 2244a are set to Being Copied "1" and indicate that data is copied currently from these corresponding real areas 13212 to 13214 to the real areas 13222 to 13224. 2245a is set to Uncopied "0" and indicates copying is not performed from a real area 13215 to a real area 13225.

FIG. 26B shows the copy progress table 224 after the host processor 12 issued a Write request to the area 1004. When Write to the area being copied is received, the processor 210 requests copy priority through the step 806 of the I/O processing program 213 (FIG. 24). Subsequently, the processor 161 first performs copy interrupt processing 6317 of the copy processing 631. As a result, the processor 210 executes the step 912 of the copy processing program 214. Because the mark "2" of Copy Interrupted is set in the area of Being Copied "1" of the copy progress table 224, the state of Table 224b occurs.

Subsequently, the processor 210 waits for the completion of COPY IO and executes the processing of the step 909, then updates the copy progress table 224. In this case, if copying to the real area 13222 only is completed, the entry 2242b that corresponds to this is updated from Copy Interrupted "2" to Copied "4" and another entry is updated from the mark "2" of Copy Interrupted to the mark "0" of Uncopied. Further, the processor 161 performs the processing of the step 6313 in the copy processing 631 and specifies the address of the real area 13214 to the area 1004. Because the processor 210 performs the processing of the step 906 and later steps of the copy processing program 213, the processor 210 sets the mark "1" of Being Copied in 2244b that corresponds to the area 1004. Thus the processor enters the state of FIG. 26C. That is, the processor 210 preferentially copies data from the real areas 13214 to 13224.

Because other processing is the same as the third embodiment, the description is omitted.

As described above, the allocation destination of the virtual volume 100 can shift the allocation destination of the virtual volume 100 from the one LU 1311 to the other LU 1312 during system operation.

Next, a fifth embodiment is described with reference to FIGS. 27 and 28.

Figure 27:
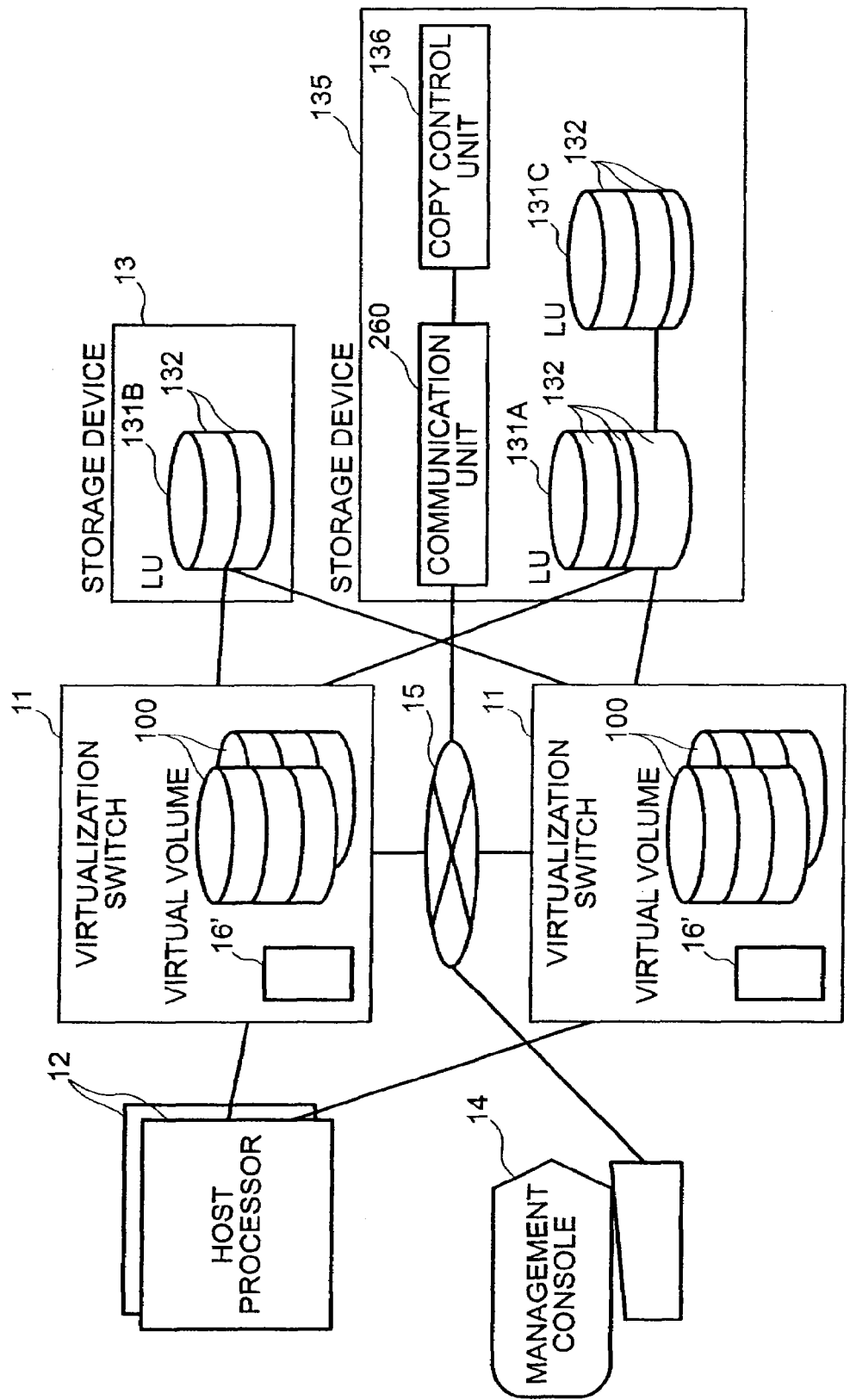
FIG. 27 is a drawing showing the overall configuration of the storage system in a fifth embodiment.

FIG. 27 shows the overall configuration of a storage system.

As compared with the system shown in FIG. 1, in FIG. 27, the independent configuration change controller 16 is removed, and a configuration change control program 16' is provided in each virtualization switch 11. Further, a storage device 135 has a copy control unit 136.

The storage device 135 differs from the storage device 13 and has the communication unit 260. The storage device 135 is connected to the LAN 15 and has the copy control unit 136. This enables data to be copied from an LU 131a within the local storage device 135 to an LU 131c. Desirably, the copy control unit 136 provided in the storage device 135 should perform copy processing while permitting the input-output from the host processor 12 to the copy source UL 131 (hereafter referred to as 'Copiable' during online operation). Needless to say, 'Copiable' need not be required during online operation. When copying is not enabled during this online operation, the time the input-output is held temporarily is prolonged.

The copy control unit 136 receives the designation of performing the copy processing from which LU 131 to which LU 131, for example, of copying data from the LU 131a to the LU 131b as well as the request of the start or completion of the copy processing from the configuration change controller 16 or the management console 14 via the communication unit 260.

Figure 28:
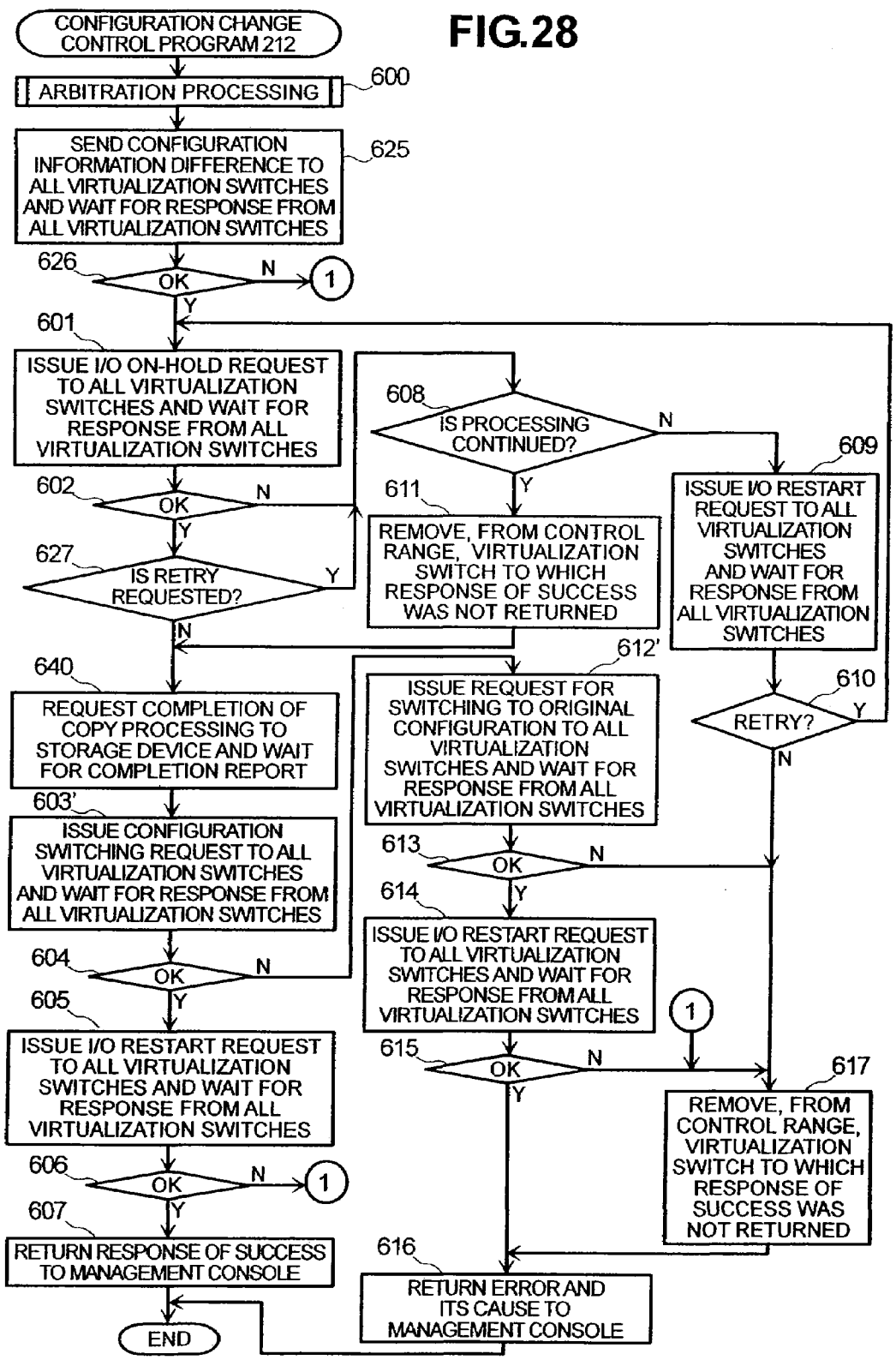
FIG. 28 is a flowchart showing the processing of the configuration change control program 212 in the fifth embodiment.

FIG. 28 is a flowchart showing the processing of the configuration control program 212 in the fifth embodiment.

FIG. 28 differs FIG. 16 in that the processing of the step 640 is inserted after the step 627.

In the processing of the step 640, the processor 161 requests to the copy control unit 136 the completion of the copy processing from the LU 131a to the LU 131b and waits for the completion report. When copying is enabled during online processing, the system administrator can request copy start at an optional period before the step 640. When copying is disabled during online processing, the processor 161 requests to the copy control unit 136 the start of the copy processing in the step 640 prior to the request of the completion. By hastening the request of the copy start, it can be anticipated that a wait completion report in the step 640 is returned quickly.

The processors 161 and 210 perform the same processing as the third embodiment and changes the configuration so that the virtual volume 100 can correspond to the LU 131*a* and the LU 131*b*. Because other processing is the same as the third embodiment, the description is omitted.

According to the fifth embodiment, by utilizing the copy function which the storage device 135 has, the allocation destination of the virtual volume 100 can be shifted from the LU 131*a* to the LU 131*b* even if the function of copying the LU 131 to the virtualization switch 11 is not provided.

Figure 29:
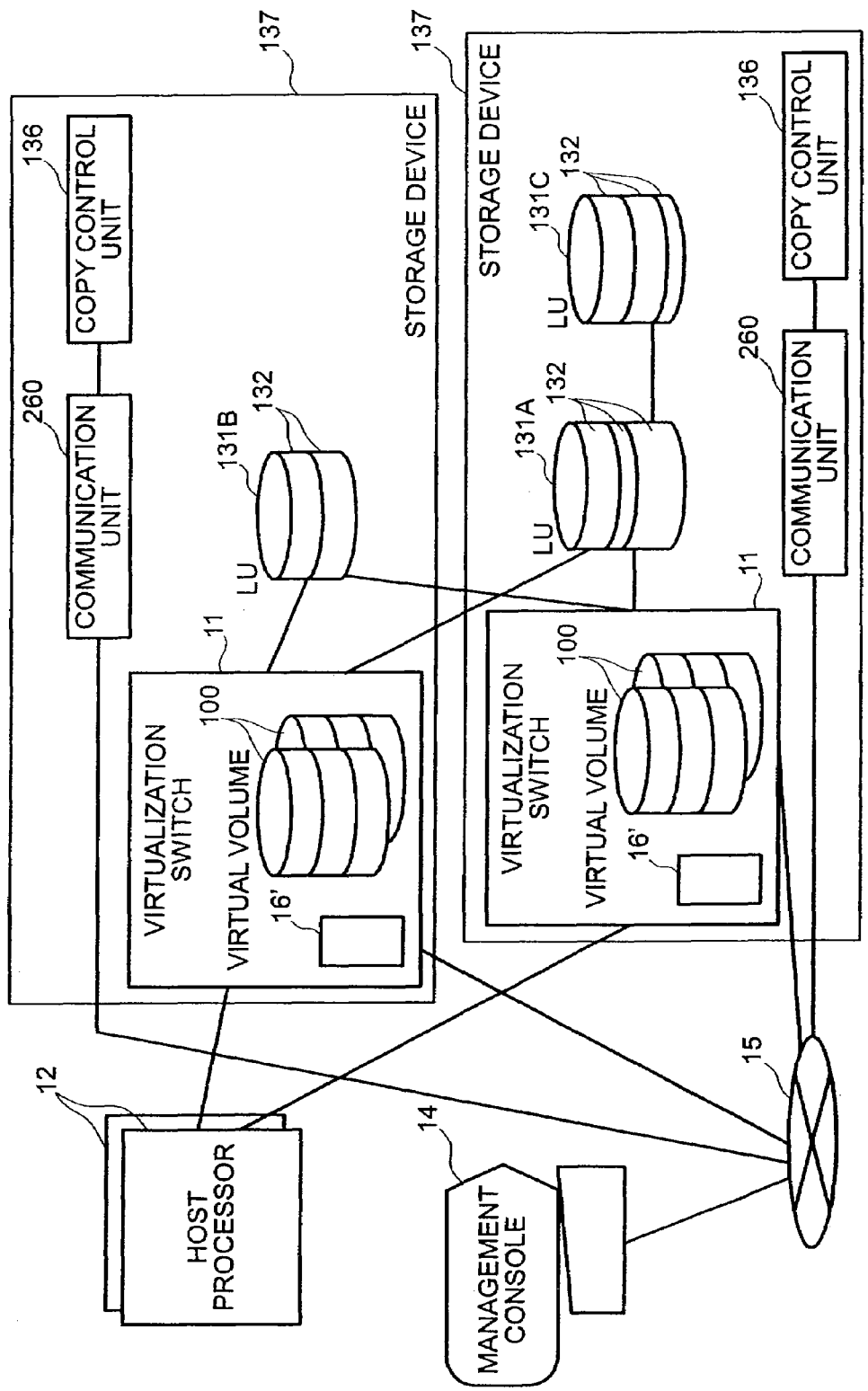
FIG. 29 is a drawing showing the overall configuration of the storage system in a sixth embodiment.

Next, yet another example (sixth embodiment) of a storage system is described with reference to FIG. 29.

In this example, a storage device 137 has a virtualization function. Each storage device 137 has the storage device 13, copy control unit 136, and communication unit 260 and the virtualization switch 11 shown in FIG. 27. Each virtualization switch 11 incorporates the configuration change control program 16' similarly to the aforementioned FIG. 27 and implements the configuration change control function. Because other aspects are the same as the fifth embodiment, the description is omitted.

According to this example, while the system is operating by a virtualization switch having a redundant configuration, a storage device that can shift the allocation destination of the virtual volume 100 from the LU 131*a* to the LU 131*b* can be realized.

Although several embodiments have been described above, the present invention can be modified variously and executed without being limited to the above examples. For instance, in the examples of FIGS. 12 and 19, one of the processors 161 and 210 is omitted and the remaining other processor can be used for the processing of a program at the same time.

What is claimed is:

1. A storage system, comprising:
    a plurality of storage devices coupled to a computer, each storage device accessing data from/to said computer,
    wherein each storage device includes:
        a plurality of logical volumes for storing data,
        a plurality of virtualization devices allocating said logical volumes to form a plurality of virtual volumes, and to process input-output requests sent from said computer to one of the virtual volumes, and
        a copy control unit migrating data in at least one of said plurality of logical volumes,
    wherein said copy control unit is operable to copy data while permitting input-output requests from said computer to at least one of said plurality of virtual volumes as a copy source volume, and
    wherein, if at least one of said plurality of storage devices receives an input-output request from said computer during said copy of data, said at least one of the plurality of storage devices holds said input-output request until said copy control unit completes the copying so that data corruption as a result of the input-output request is prevented,
    wherein at least one of said plurality of storage devices is operable to perform steps comprising:
        issuing, to each of said plurality of virtualization devices, a request for completing all input-output requests received from said computer that are being processed by said virtualization devices and temporarily holding any subsequent input-output requests received from said computer;
        receiving, from the plurality of virtualization devices, completion reports of the input-output requests being processed by said virtualization devices in response to said request for completing;
        sending an instruction of an allocation change of a storage area to all said virtualization devices if all of the completion reports from all said virtualization devices are received;
        receiving completion reports of the allocation change from said virtualization devices; and
        sending an instruction to said virtualization devices for releasing the input-output requests that are being temporarily held.

2. A storage system according to claim 1, wherein each virtualization device that did not send its completion report is removed from a control range and allocation of its storage area is not changed.

3. A storage system according to claim 1, wherein said each of virtualization devices further comprises:
    a processor;
    a configuration management program that, when executed by the processor, performs processing of a configuration change;
    at least one memory device that stores a configuration information table registering configuration information that associates each virtual volume with said storage area that becomes real area and a difference information table recording a difference before and after the configuration change; and
    a configuration change control program that, when executed by the processor, sends difference information of the configuration information to said each of virtualization devices with reference to the difference information table when sending the instruction of an allocation change of the storage area,
    wherein each virtualization device executes the configuration management program and changes configuration information of a relevant entry of its own configuration information table in accordance with the difference information.

4. A storage system according to claim 3, further comprising:
    a management console including an input unit that inputs a request of said configuration change to said at least one of the plurality of storage devices and a display unit that displays a status of said configuration change.

5. A storage system according to claim 4, wherein:
    each of the plurality of storage devices includes a communication unit, each communication unit being coupled to said copy control unit and said management console,
    said copy control unit performs copy processing if said copy control unit receives a start of copy processing among said plurality of logical volumes, and
    at least one of the plurality of storage devices performs instructions to:
        send configuration information difference,
        issue an input-output on-hold request after receiving a response of said configuration information difference, and
        issue a configuration switching request after receiving a response of said input-output on-hold request.

6. A method of storing data, comprising:
    accessing data to/from a computer using of a plurality of storage devices, each storage device including a plurality of logical volumes for storing data; and
    for each of said plurality of storage devices:
        allocating said logical volumes to form a plurality of virtual volumes, and processing input-output requests sent from said computer to one of the virtual volumes;
        migrating data in at least one of said plurality of logical volumes;

permitting input-output requests from said computer to at least one of said plurality of virtual volumes as a copy source volume while copying data; and if at least one of said plurality of storage devices receives an input-output request from said computer during said copy of data, holding said input-output request until copying is complete so that data corruption as a result of the input-output request is prevented, wherein at least one of said plurality of storage devices is operable to perform steps comprising:

issuing a request for completing all input-output requests received from said computer that are being processed and temporarily holding any subsequent input-output requests received from said computer;

receiving a completion report of the input-output requests being processed in response to said request for completing;

sending an instruction of an allocation change of a storage area upon receiving a completion report;

receiving a completion report of the allocation change; and sending an instruction for releasing the input-output requests that are being temporarily held.

7. A method according to claim 6, further comprising:
removing from a control range any virtualization device that did not send its completion report, allocation of its storage area not being changed.

8. A method according to claim 6, further comprising:
processing a configuration change;

storing a configuration information table registering configuration information that associates each virtual volume with said storage area that becomes a real area and a difference information table recording a difference before and after the configuration change; and sending difference information of the configuration information to each of the virtualization devices with reference to the difference information table when sending the instruction of allocation change of its own storage area, wherein the configuration information of a relevant entry of its own configuration information table is changed in accordance with the difference information.

9. A method according to claim 8, further comprising:
inputting a request of said configuration change to said at least one of the plurality of storage devices and displaying a status of said configuration change.

10. A method according to claim 9, further comprising:
sending a configuration information difference;

issuing an input-output on-hold request after receiving a response to said configuration information difference; and issuing a configuration switching request after receiving a response to said input-output on-hold request.

* * * * *